US012205072B1

United States Patent
Mohammed et al.

(10) Patent No.: US 12,205,072 B1
(45) Date of Patent: Jan. 21, 2025

(54) FULFILLING ORDERS FOR MULTIPLE ITEMS FROM MULTIPLE SOURCES VIA MULTIMODAL CHANNELS

(71) Applicant: Amazon Technologies, Inc., Seattle, WA (US)

(72) Inventors: Raashid Mohammed, Lynnwood, WA (US); Darren Ernest Canavor, Kirkland, WA (US); Ankit Pandey, Bellevue, WA (US); Farouq Halawa, Seattle, WA (US); Erik Roy Veilleux, Sainte-Marie (CA)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 17/944,094

(22) Filed: Sep. 13, 2022

(51) Int. Cl.
*G06Q 10/087* (2023.01)
*B60P 1/54* (2006.01)
(Continued)

(52) U.S. Cl.
CPC .......... *G06Q 10/087* (2013.01); *B60P 1/5423* (2013.01); *B64C 39/024* (2013.01);
(Continued)

(58) Field of Classification Search
CPC ............ G06Q 10/087; G06Q 10/08355; B60P 1/5423; B64C 39/024; G05D 1/101; G05D 1/0212; B64D 1/02
(Continued)

(56) References Cited

U.S. PATENT DOCUMENTS 1,031,049 A 7/1912 Conzelman
4,865,248 A 9/1989 Barth
(Continued)

FOREIGN PATENT DOCUMENTS

CN 106143941 A 11/2016
CN 106203900 A 12/2016
(Continued)

OTHER PUBLICATIONS

Anonymous: "UPS has a Delivery Truck That Can Launch a Drone," The Verge, Feb. 21, 2017, Retrieved from the Internet on May 2, 2018, URL: https://www.theverge.com/2017/2/21/14691062/ups-drone-delivery-truck-test-completed-video, pp. 1-3.
(Continued)

*Primary Examiner* — Luna Champagne
(74) *Attorney, Agent, or Firm* — Athorus, PLLC

(57) ABSTRACT

When a customer places an order for a first item and a second item, delivery systems utilize an aerial vehicle to transport the first item from a first source of the first item to a second source of the second item. At the second source, the first item and the second item are transferred into a carrier vehicle and transported toward a destination of the order. Once the carrier vehicle arrives within a vicinity of the destination, an autonomous ground vehicle departs the carrier vehicle with the first item and the second item, and delivers the first item and the second item to the destination. The delivery systems effectively expand the capacity of sources of items, and simplify processes for delivering orders for items, by enabling items from multiple sources to be combined at a single source prior to delivery, and transported to a destination from the single source.

20 Claims, 21 Drawing Sheets

(51) Int. Cl.
*B64C 39/02* (2023.01)
*B64D 1/02* (2006.01)
*G05D 1/00* (2024.01)
*G06Q 10/0835* (2023.01)
*B64U 101/60* (2023.01)

(52) U.S. Cl.
CPC ............ *B64D 1/02* (2013.01); *G05D 1/0212* (2013.01); *G05D 1/101* (2013.01); *G06Q 10/08355* (2013.01); *B64U 2101/60* (2023.01)

(58) Field of Classification Search
USPC ........................................................ 705/28
See application file for complete search history.

(56) References Cited

U.S. PATENT DOCUMENTS

| | | |
|---|---|---|
| 4,954,962 A | 9/1990 | Evans, Jr. et al. |
| 5,040,116 A | 8/1991 | Evans, Jr. et al. |
| 5,386,462 A | 1/1995 | Schlamp |
| 5,995,898 A | 11/1999 | Tuttle |
| 6,344,796 B1 | 2/2002 | Ogilvie et al. |
| 6,426,699 B1 | 7/2002 | Porter |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |
| 7,337,944 B2 | 3/2008 | Devar |
| 8,732,039 B1 | 5/2014 | Chen et al. |
| 8,956,100 B2 | 2/2015 | Davi et al. |
| 9,033,285 B2 | 5/2015 | Iden et al. |
| 9,139,310 B1 | 9/2015 | Wang |
| 9,244,147 B1 | 1/2016 | Soundararajan et al. |
| 9,434,267 B2 | 9/2016 | Wang et al. |
| 9,481,458 B2 | 11/2016 | Magaña et al. |
| 9,494,937 B2 | 11/2016 | Siegel et al. |
| 9,545,852 B2 | 1/2017 | Streett |
| 9,623,760 B2 | 4/2017 | Wang et al. |
| 9,718,564 B1 | 8/2017 | Beckman et al. |
| 9,950,814 B1 | 4/2018 | Beckman et al. |
| 10,013,886 B2 | 7/2018 | Blomberg et al. |
| 10,029,787 B1 | 7/2018 | Lesser et al. |
| 10,163,069 B2 | 12/2018 | Borley et al. |
| 10,310,500 B1 | 6/2019 | Brady et al. |
| 10,384,692 B2 | 8/2019 | Beckman et al. |
| 10,421,542 B2 | 9/2019 | Beckman et al. |
| 10,532,885 B1 | 1/2020 | Brady et al. |
| 10,625,859 B2 | 4/2020 | Beckman et al. |
| 10,676,107 B2 | 6/2020 | Beckman et al. |
| 11,235,929 B1 | 2/2022 | Brady et al. |
| 11,427,229 B2 | 8/2022 | Beckman et al. |
| 11,993,294 B2 | 5/2024 | Beckman et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2003/0040980 A1 | 2/2003 | Nakajima et al. |
| 2003/0141411 A1 | 7/2003 | Pandya et al. |
| 2005/0060164 A1 | 3/2005 | Illion |
| 2006/0136237 A1 | 6/2006 | Spiegel et al. |
| 2006/0288902 A1 | 12/2006 | McGuire |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0293978 A1 | 12/2007 | Wurman et al. |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0106124 A1 | 4/2009 | Yang |
| 2009/0149985 A1 | 6/2009 | Chirnomas |
| 2009/0236470 A1 | 9/2009 | Goossen et al. |
| 2009/0299903 A1 | 12/2009 | Hung et al. |
| 2009/0314883 A1 | 12/2009 | Arlton et al. |
| 2010/0070342 A1 | 3/2010 | Hu et al. |
| 2011/0035149 A1 | 2/2011 | McAndrew et al. |
| 2011/0264311 A1 | 10/2011 | Lee et al. |
| 2012/0030133 A1 | 2/2012 | Rademaker |
| 2012/0039694 A1 | 2/2012 | Suzanne |
| 2012/0109419 A1 | 5/2012 | Mercado |
| 2012/0219397 A1 | 8/2012 | Baker |
| 2013/0073477 A1 | 3/2013 | Grinberg |
| 2013/0081245 A1 | 4/2013 | Vavrina et al. |
| 2013/0148123 A1 | 6/2013 | Hayashi |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2014/0022055 A1 | 1/2014 | Levien et al. |
| 2014/0030444 A1 | 1/2014 | Swaminathan et al. |
| 2014/0032034 A1 | 1/2014 | Raptopoulos et al. |
| 2014/0052661 A1 | 2/2014 | Shakes et al. |
| 2014/0136282 A1 | 5/2014 | Fedele |
| 2014/0254896 A1 | 9/2014 | Zhou et al. |
| 2015/0006005 A1 | 1/2015 | Yu et al. |
| 2015/0069968 A1 | 3/2015 | Pounds |
| 2015/0102154 A1 | 4/2015 | Duncan et al. |
| 2015/0120602 A1 | 4/2015 | Huffman et al. |
| 2015/0129716 A1 | 5/2015 | Yoffe |
| 2015/0153175 A1 | 6/2015 | Skaaksrud |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0227882 A1 | 8/2015 | Bhatt |
| 2015/0246727 A1 | 9/2015 | Masticola et al. |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0370251 A1* | 12/2015 | Siegel .................... B64D 1/22 701/2 |
| 2016/0009413 A1 | 1/2016 | Lee et al. |
| 2016/0033966 A1 | 2/2016 | Farris et al. |
| 2016/0104099 A1 | 4/2016 | Villamar |
| 2016/0114488 A1 | 4/2016 | Medina et al. |
| 2016/0137404 A1 | 5/2016 | Steiner |
| 2016/0144734 A1 | 5/2016 | Wang et al. |
| 2016/0144982 A1 | 5/2016 | Sugumaran |
| 2016/0185466 A1 | 6/2016 | Dreano |
| 2016/0207627 A1 | 7/2016 | Hoareau et al. |
| 2016/0257401 A1 | 9/2016 | Buchmueller et al. |
| 2016/0266578 A1 | 9/2016 | Douglas et al. |
| 2016/0266579 A1 | 9/2016 | Chen et al. |
| 2016/0292798 A1 | 10/2016 | Berry et al. |
| 2016/0299233 A1 | 10/2016 | Levien et al. |
| 2016/0300174 A1 | 10/2016 | Grichnik |
| 2016/0307155 A1 | 10/2016 | Bell |
| 2016/0334229 A1 | 11/2016 | Ross et al. |
| 2016/0364678 A1 | 12/2016 | Cao |
| 2016/0364989 A1 | 12/2016 | Speasl et al. |
| 2017/0011333 A1 | 1/2017 | Greiner et al. |
| 2017/0032315 A1 | 2/2017 | Gupta et al. |
| 2017/0038780 A1 | 2/2017 | Fandetti |
| 2017/0096222 A1 | 4/2017 | Spinelli et al. |
| 2017/0098378 A1 | 4/2017 | Soundararajan et al. |
| 2017/0101017 A1 | 4/2017 | Streett |
| 2017/0129352 A1 | 5/2017 | Lin et al. |
| 2017/0164319 A1 | 6/2017 | Skaaksrud et al. |
| 2017/0167881 A1 | 6/2017 | Rander et al. |
| 2017/0174091 A1 | 6/2017 | Miller et al. |
| 2017/0190260 A1 | 7/2017 | Wang et al. |

(56) References Cited

U.S. PATENT DOCUMENTS

| | | | |
|---|---|---|---|
| 2017/0263131 A1 | 9/2017 | Blomberg et al. | |
| 2017/0293884 A1 | 10/2017 | Cheatham, I et al. | |
| 2017/0313421 A1 | 11/2017 | Gil | |
| 2017/0316701 A1 | 11/2017 | Gil et al. | |
| 2017/0323257 A1 | 11/2017 | Cheatham, I et al. | |
| 2017/0352003 A1 | 12/2017 | Bertoli et al. | |
| 2018/0069650 A1 | 3/2018 | Tran et al. | |
| 2018/0121876 A1* | 5/2018 | Doherty | G05D 1/0044 |
| 2018/0130008 A1 | 5/2018 | Liu | |
| 2018/0150798 A1 | 5/2018 | Wilkinson et al. | |
| 2018/0189725 A1 | 7/2018 | Mattingly et al. | |
| 2018/0268428 A1 | 9/2018 | Shariff et al. | |
| 2019/0012631 A1 | 1/2019 | Chatani | |
| 2019/0161190 A1 | 5/2019 | Gil et al. | |
| 2019/0220819 A1 | 7/2019 | Banvait et al. | |
| 2019/0347614 A1 | 11/2019 | Khasis | |
| 2020/0130510 A1* | 4/2020 | Eck | B60L 53/14 |

FOREIGN PATENT DOCUMENTS

| | | |
|---|---|---|
| CN | 106503954 A | 3/2017 |
| EP | 1626537 A1 | 2/2006 |
| JP | 2001156929 A | 6/2001 |
| JP | 2001359200 A | 12/2001 |
| JP | 2008066992 A | 3/2008 |
| JP | 2008524714 A | 7/2008 |
| JP | 2014175747 A | 9/2014 |
| JP | 2016531797 A | 10/2016 |

OTHER PUBLICATIONS

Mike Murphy, "Google wants to deliver packages from self-driving trucks," published Feb. 9, 2016, URL: https://qz.com/613277/google-wants-to-deliver-packages-from-self-driving-trucks/, 4 pages.

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

URL: https://web.archive.org/web/20160804001046/https://www.starship.xyz/, download date: Aug. 4, 2016, 21 pages.

* cited by examiner

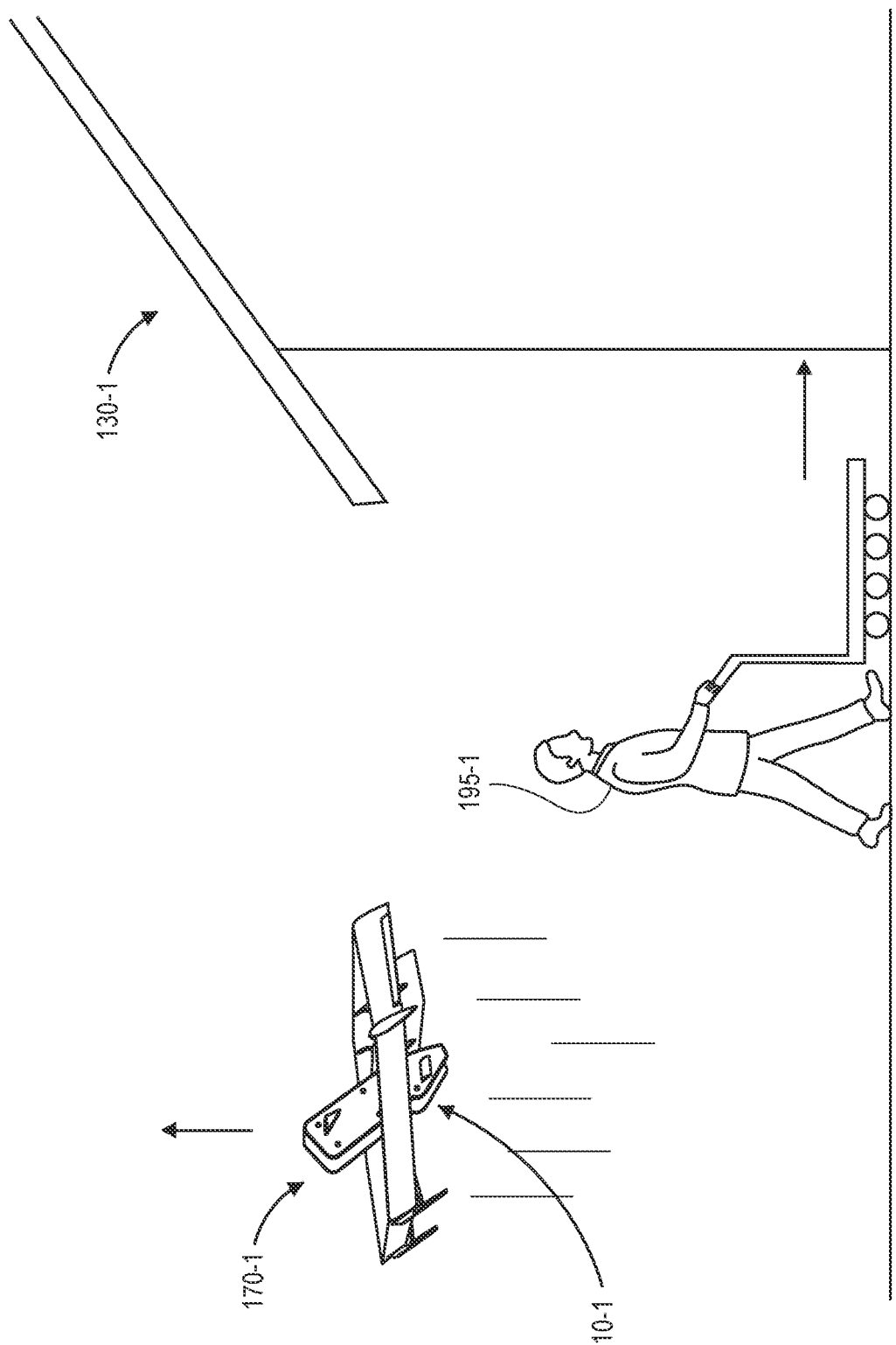

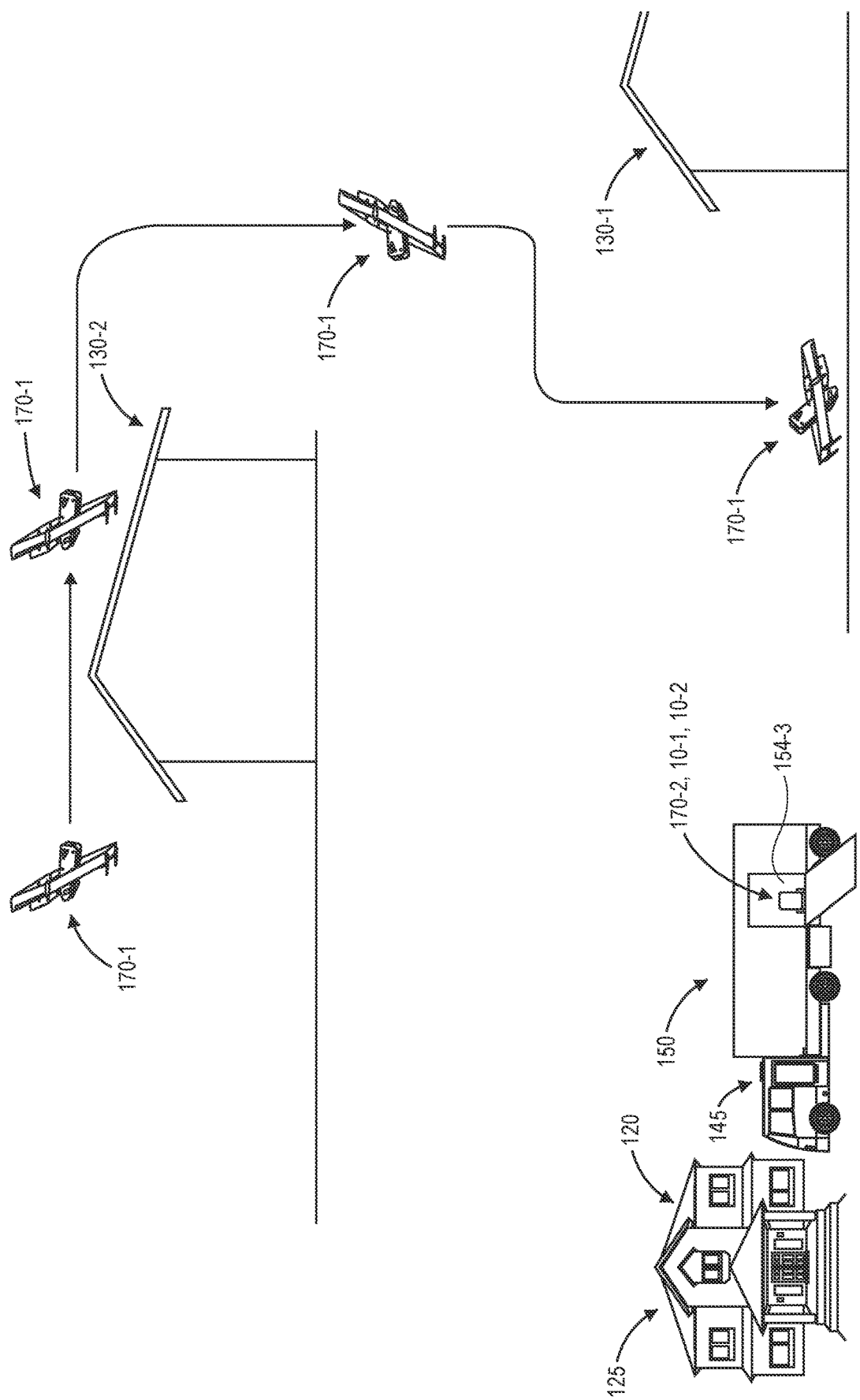

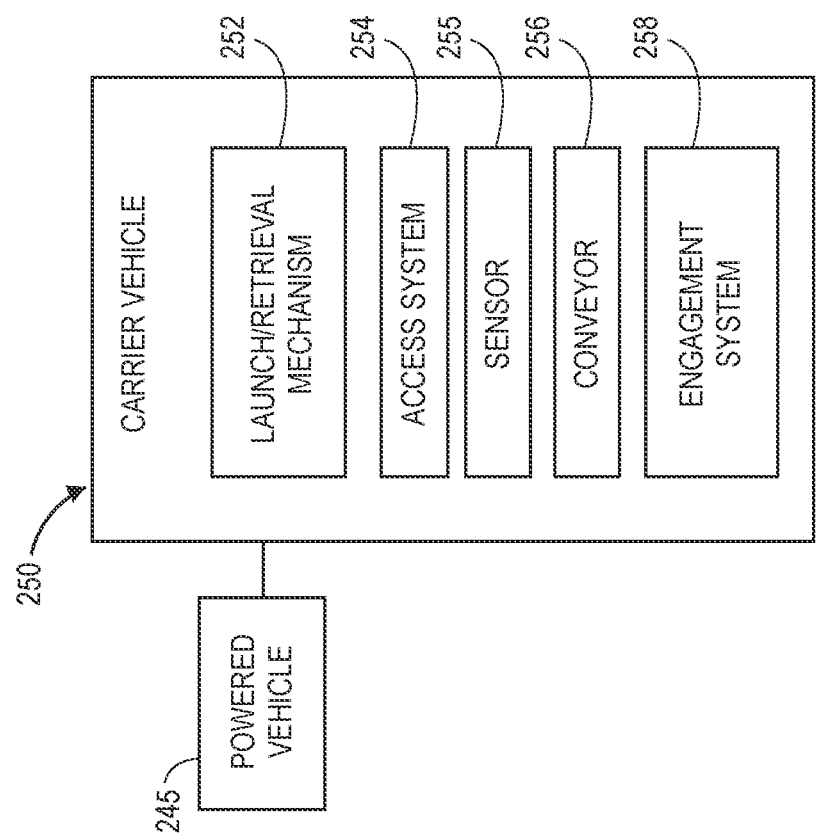
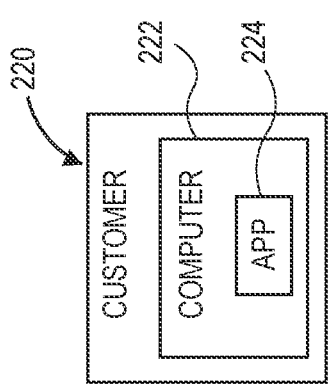
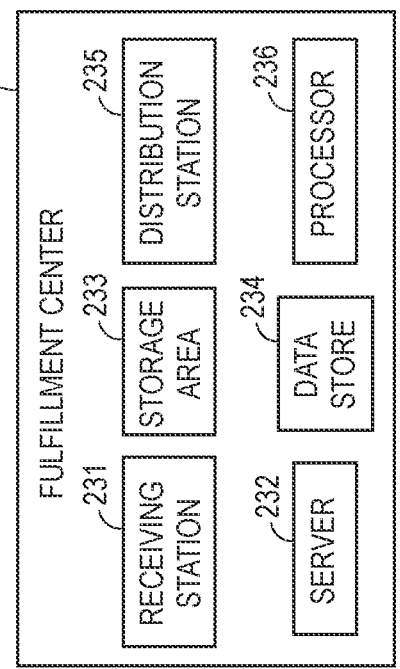
FIG. 2D
FIG. 2B
FIG. 2C

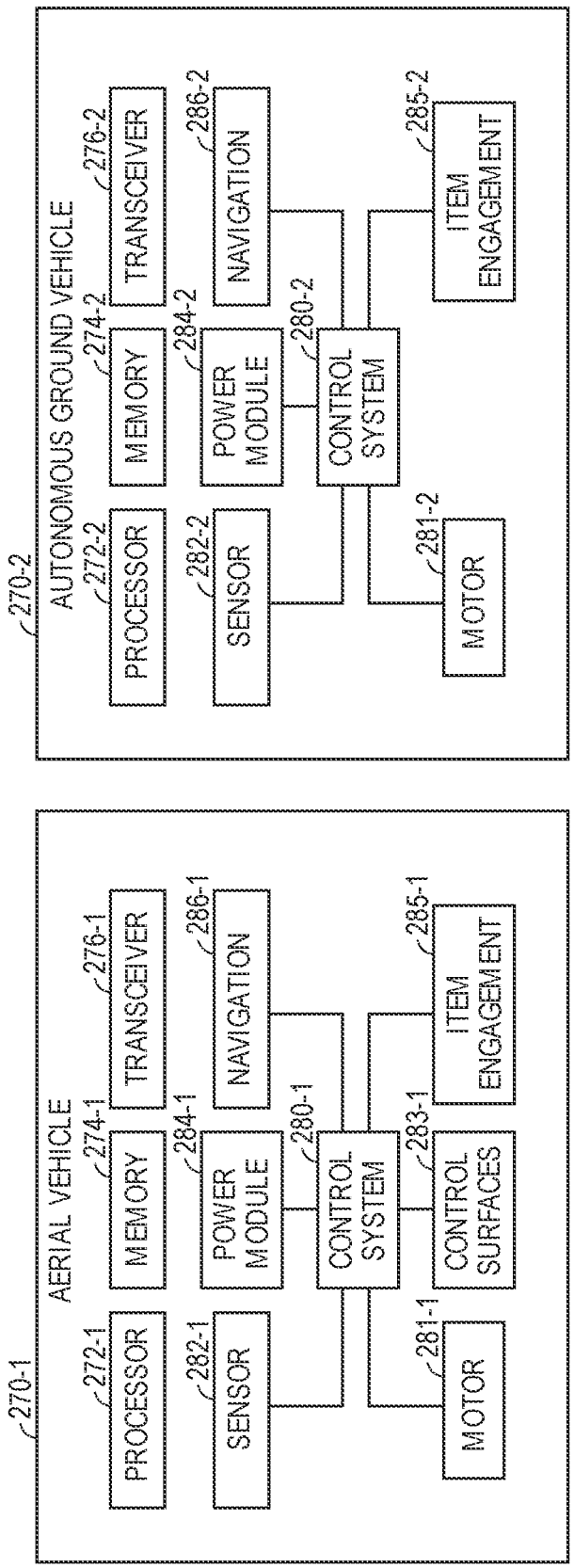

FULFILLING ORDERS FOR MULTIPLE ITEMS FROM MULTIPLE SOURCES VIA MULTIMODAL CHANNELS

BACKGROUND

Electronic marketplaces enable customers to view and evaluate items, and to place orders for the purchase of such items over the Internet, from any corner of the globe. Today, many electronic marketplaces operate in association with one or more fulfillment centers, which are facilities, warehouses or another like structures that are constructed in distributed, centralized locations and adapted to receive items from sources of the items (e.g., manufacturers, merchants, sellers, vendors or other fulfillment centers). Fulfillment centers may include stations for receiving shipments of items, for storing such items, and/or for preparing such items for delivery to customers. When an order for a purchase of one or more items stored in a fulfillment center is received from a customer, the ordered items may be retrieved from spaces or areas in which such items are stored, and prepared for delivery to the customer, e.g., by packing the ordered items into one or more appropriate containers with a sufficient type and amount of dunnage, and delivering the containers to a destination designated by the customer.

In order to accommodate large numbers and types of items of various sizes, some fulfillment centers may feature storage areas as large as one million square feet or more, and are constructed at a cost of dozens of millions of dollars or more. Moreover, fulfillment centers are often sized to accommodate maximum receiving, storing and distribution flows of items and capacities during peak periods, e.g., during year-end holiday seasons, and yet are underutilized during times of reduced demand.

As offerings at electronic marketplaces continue to grow and diversify, however, a single fulfillment center frequently does not include all of the items requested by a customer in a given order. Thus, where a customer places an order for multiple items that are available from different sources in different locations, the order is frequently fulfilled by shipping the items of the order separately from the respective sources, which commonly causes the items to arrive at a destination at different times, and at greater costs to either the customer or the sources of the items. Such delays or deficiencies typically diminish the experiences of customers, who order their items for any personal reasons and occasionally have little patience for back-end logistical processes or increased shipping costs.

BRIEF DESCRIPTION OF THE DRAWINGS

FIGS. 1A through 1L are views of aspects of one delivery system in accordance with implementations of the present disclosure.

FIGS. 2A through 2F are block diagrams of components of one delivery system in accordance with implementations of the present disclosure.

DETAILED DESCRIPTION

As is set forth in greater detail below, the present disclosure is directed to delivery systems for fulfilling orders via multimodal channels and from different sources. More specifically, in some implementations, the systems and methods of the present disclosure are directed to fulfilling orders for multiple items by delivering one or more of the items of an order from one source to a location of a source of one or more other items of the order, where the items may be loaded into a carrier vehicle and transported to a destination associated with the order. In some implementations, items included in an order may be loaded into an unmanned aerial vehicle (or drone) at a fulfillment center or another source of the items, and delivered by air to another fulfillment center or another source of other items included in the order. At the other fulfillment center or source, all of the items included in the order may be transferred into a carrier vehicle (e.g., a trailer, which may be coupled to a road tractor), and the carrier vehicle may be transported to a location associated with a destination of the order. Once the carrier vehicle has arrived at the location associated with the destination, the items may be transported to the destination by an autonomous ground vehicle, e.g., a robot.

The systems and methods of the present disclosure thus enable orders to be fulfilled by delivery systems via multimodal channels, e.g., first by drone, then by carrier, then by robot, in an efficient manner and from multiple sources, which may be selected in any manner. For example, sources of items may be selected based on an overall cost to deliver the items individually from one source to another source, or collectively from the other source to the destination of the order, either independently or along with one or more other items of one or more other orders. By transporting items included in an order that are not in inventory at one source, by air to that source, and combining the items with other items included in the order prior to transporting all of the items together to a destination of the order, the fulfillment of the order may be achieved quickly and effectively, and in a seamless manner from a customer's perspective, without requiring the construction of increasingly larger fulfillment centers.

Figure 1A:
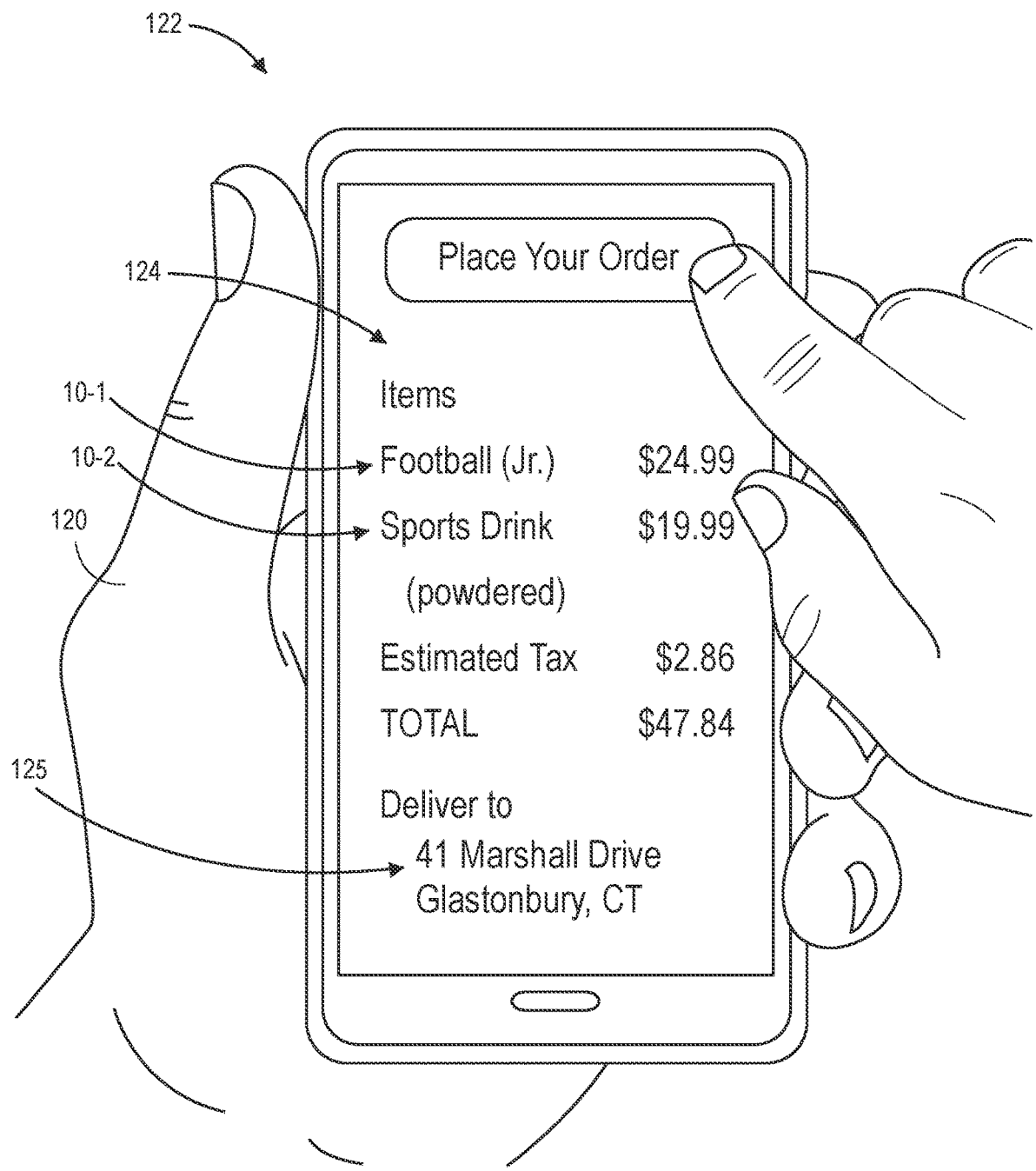

Referring to FIGS. 1A through 1L, views of aspects of one delivery system in accordance with implementations of the present disclosure are shown. As is shown in FIG. 1A, a customer 120 places an order for a delivery of two items 10-1, 10-2 (viz., a junior-size football and a powdered sports drink) to a destination 125 (e.g., a home) via an application 124 executed by a mobile device 122 or another computer system.

The customer 120 may have selected the items 10-1, 10-2, in any manner, such as by entering one or more keywords (e.g., "football," "sports," or the like) into a text box of the application 124, selecting one or more icons or features representing categories on a user interface of the application 124, uttering one or more voice commands to the application 124 that are captured by microphones or other sensors of the mobile device 122, or in any other manner. For example, in some implementations, customer 120 may browse through one or more pages of a network site associated with an electronic marketplace or other platform for engaging in electronic commerce, and select the items 10-1, 10-2 by one or more gestures or other interactions with the application 124, e.g., by way of an interactive display of the mobile device 122. The customer 120 may further specify the destination 125 by entering text or making other gestures or interactions with the application 124. Alternatively, the items 10-1, 10-2 may be of any other type or form, and need not be limited to sporting goods or food and beverage products, respectively. The application 124 may be a browser or like application for connecting and interacting with one or more network sites (e.g., web sites) associated with an electronic marketplace or other platform, a dedicated application for connecting and interacting with the electronic marketplace or other platform, or any other application.

Figure 1B:
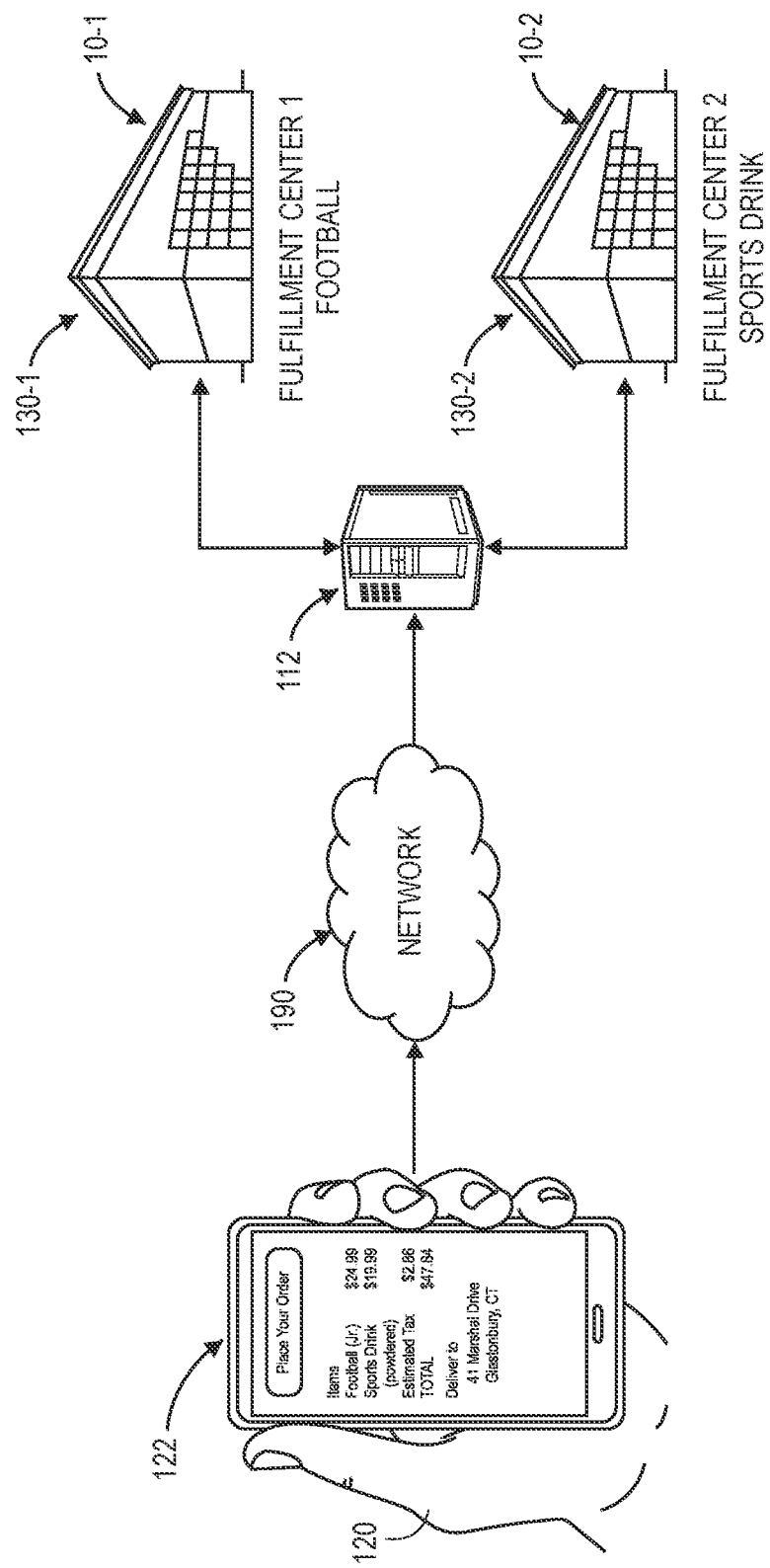

As is shown in FIG. 1B, the mobile device 122 transmits information or data regarding the order placed by the customer 120 to a server 112 or another computer device or system that may be associated with an electronic marketplace or another service, system or forum for making items from a variety of entities (e.g., manufacturers, merchants, sellers, or vendors) available for download, purchase, rent, lease or borrowing by customers using a networked computer infrastructure. The server 112 may be provided in a single physical location, or in one or more alternate or virtual locations, e.g., in a "cloud"-based environment.

The server 112 may process the information or data received from the mobile device 112 and identify a first source of the item 10-1, viz., a fulfillment center 130-1, and a second source of the item 10-2, viz., a fulfillment center 130-2. The server 112 may be programmed with or may have access to any type or form of information or data regarding sources of items that are available for purchase from the electronic marketplace or other service, system or forum. The server 112 may select the fulfillment center 130-1 and the fulfillment center 130-2 as the first source of the item 10-1 and the second source of the item 10-2 on any basis, e.g., an overall cost to deliver the items 10-1, 10-2 to the customer 120, which may be represented financially or in any other manner, such as in terms of time, distance, or opportunities, or on any other basis. Upon selecting the fulfillment center 130-1 and the fulfillment center 130-2, the server 112 may transmit one or more sets of instructions to computer devices or systems associated with the fulfillment center 130-1 and the fulfillment center 130-2, respectively, indicating that each of the fulfillment centers has been selected as a source for one of the items 10-1, 10-2.

In some implementations, the server 112 may select from any number of different sources of the items 10-1, 10-2 based on such information or data. Such sources may but need not include one or more fulfillment centers (e.g., warehouses or other facilities configured for receiving, storing or distributing items from various entities) or sources of items other than fulfillment centers, e.g., sole sources, or manufacturers, merchants, sellers or vendors that may have assembled, created, grown or manufactured any number of items of any type or form.

Figure 1C:
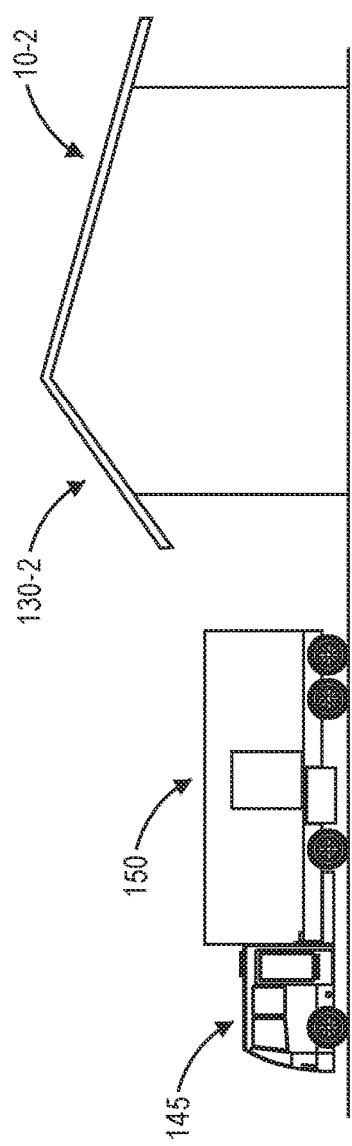
Figure 1C:
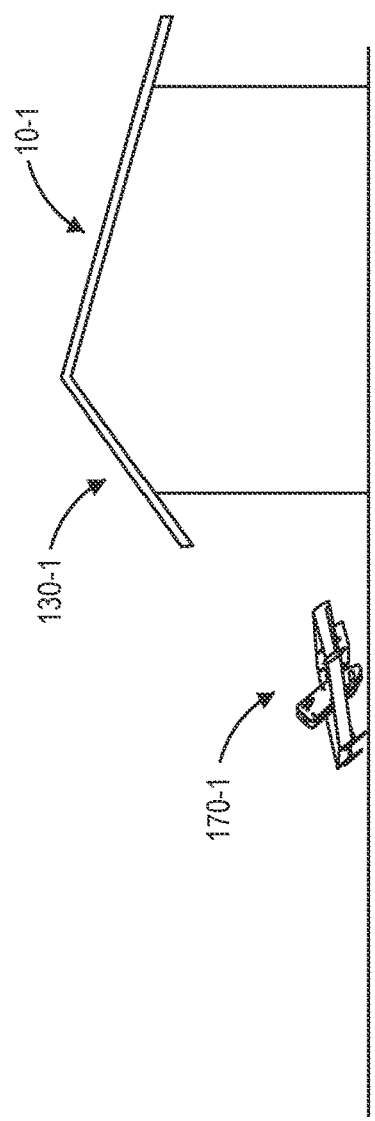
Figure 1C:
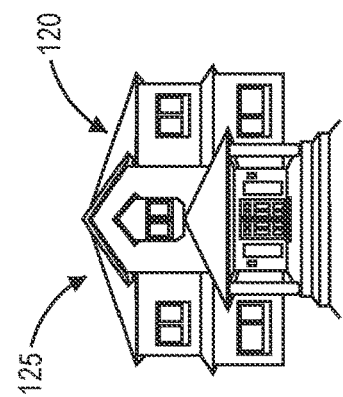

In accordance with implementations of the present disclosure, delivery systems may have access to any number of sources of items by way of any number of multimodal channels. For example, as is shown in FIG. 1C, the fulfillment center 130-1 may be associated with any number of unmanned aerial vehicles 170-1, while the fulfillment center 130-2 may be associated with any number of carrier vehicles 150, e.g., trailers, which may be self-powered or associated with one or more powered vehicles 145, e.g., road tractors. Alternatively, or additionally, either or both of the fulfillment centers 130-1, 130-2 may be associated with any other types or forms of transportation systems, including but not limited to rail-based systems (e.g., locomotives and rail cars configured for travel via railways) as well or sea-based systems (ships configured for travel on bodies of water via shipping routes or channels), or other aerial vehicles or other ground vehicles.

Although FIG. 1C shows only two sources of the items, viz., the fulfillment centers 130-1, 130-2, in some implementations, the order placed by the customer 120 as shown in FIG. 1A may include a request for any number of such items, which may be obtained from any number of such sources. Moreover, in some implementations, the aerial vehicle 170-1 or the carrier vehicle 150 may be owned by or associated with the respective fulfillment centers 130-1, 130-2 or an electronic marketplace. Alternatively, in some implementations, the aerial vehicle 170-1 may be owned or operated by one or more third-party entities, or provided as a service to either of the fulfillment centers 130-1, 130-2 or an electronic marketplace.

Figure 1D:
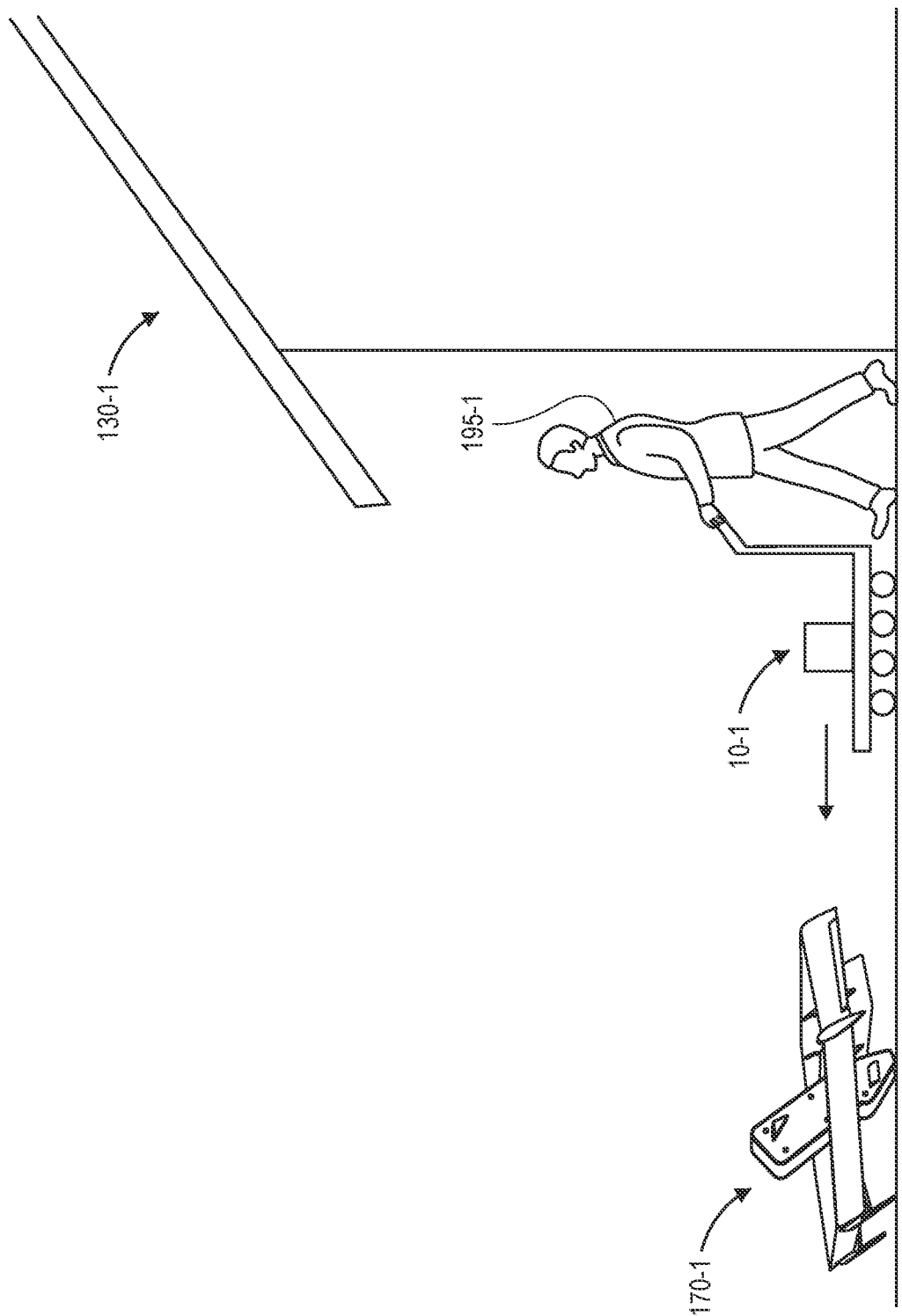

As is shown in FIG. 1D, the item 10-1 is loaded onto the aerial vehicle 170-1 at the fulfillment center 130-1. For example, upon selecting the fulfillment center 130-1 as the source of the item 10-1, the server 112 may transmit one or more sets of instructions to a computer device or system associated with the fulfillment center 130-1, and instruct the computer device or system to prepare the item 10-1 for delivery to a location of the fulfillment center 130-2, and to load the item 10-1 onto the aerial vehicle 170-1. As is shown in FIG. 1D, an associate 195-1 or other personnel at the fulfillment center 130-1 may transport the item 10-1 by hand, by cart, or by any other system to a takeoff or landing area for aerial vehicles, before manually installing or inserting the item 10-1 into the aerial vehicle 170-1, and securing the item 10-1 therein. Alternatively, the item 10-1 may be loaded onto the aerial vehicle 170-1 in any other manner, such as by one or more automated systems, e.g., robots, robotic arms or machines or other automatic features, or by a combination of one or more humans and any number of machines or other automatic features. The item 10-1 may be loaded onto the aerial vehicle 170-1 in a bin, a tote, or another container, in any packaging, or independently without a container or packaging.

In some implementations, where a cargo bay or other compartment within the aerial vehicle 170-1 has sufficient capacity, one or more items may be loaded onto the aerial vehicle 170-1, in addition to the item 10-1. In some implementations, a cargo bay or other compartment of the aerial vehicle 170-1 may be modular or adjustable in nature, and sized or configured to accommodate the item 10-1 alone, or any number of other items. For example, the cargo bay or other compartment may include sub-compartments into which individual items, or individual collections of items, may be separately inserted. Alternatively, the item 10-1 may be loaded onto the aerial vehicle 170-1 in a bin, a tote, or another container that may likewise be modular or adjustable in nature, and sized or configured to accommodate any number of other items, e.g., in one or more sub-compartments.

In some implementations, where a demand for one or more items that are located at the fulfillment center 130-1 is known or believed to exist at the fulfillment center 130-2, any number of such items may be loaded onto the aerial vehicle 170-1 at the fulfillment center 130-1 along with the item 10-1 and delivered to the fulfillment center 130-2. The one or more items may be selected by the server 112 or any other computer device or system to accompany the item 10-1 on any basis.

As is shown in FIG. 1E, after the item 10-1 has been loaded onto the aerial vehicle 170-1, the aerial vehicle 170-1 may depart from the fulfillment center 130-1 with the item 10-1, and the associate 195-1 may return to the fulfillment center 130-1 to perform any other tasks or functions. For example, the server 112 or another computer device or system at the fulfillment center 130-1 or in any other location may program the aerial vehicle 170-1 with coordinates, geolocators or other identifiers of a location of the fulfillment center 130-2.

Figure 1F:
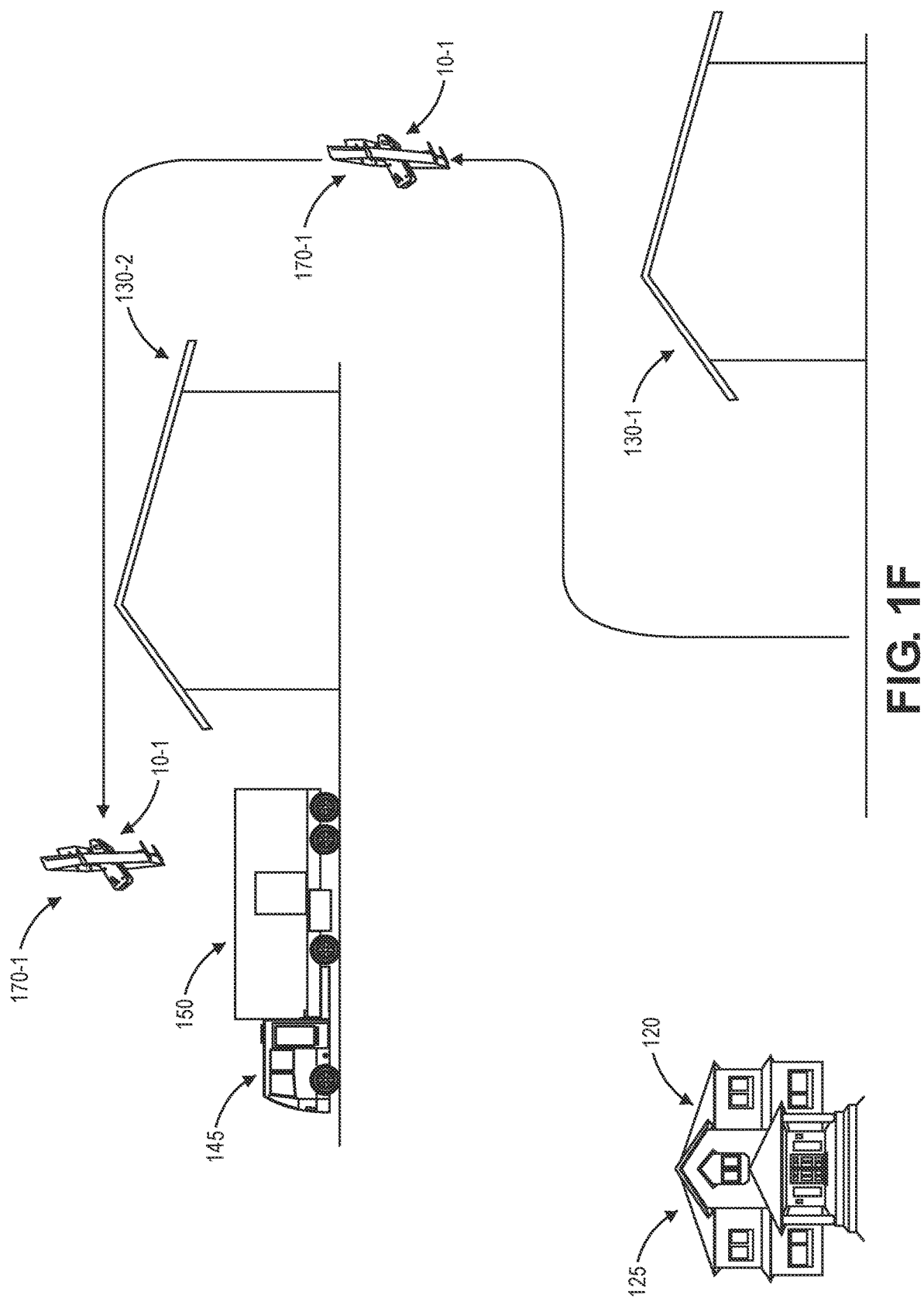

As is shown in FIG. 1F, the aerial vehicle 170-1 travels on one or more selected courses, and at one or more selected speeds or altitudes, from a location of the fulfillment center 130-1 to the location of the fulfillment center 130-2 by operating any number of motors, propellers, control surfaces or other components, as necessary. The aerial vehicle 170-1 may be programmed to travel on one or more selected courses, speeds or altitudes, or may autonomously select one or more courses, speeds or altitudes on any basis, e.g., on any information or data captured or determined by one or more sensors provided thereon, such as detected obstacles, wind speeds, weather or other conditions, or subject to any number of laws or regulatory restrictions.

Figure 1G:
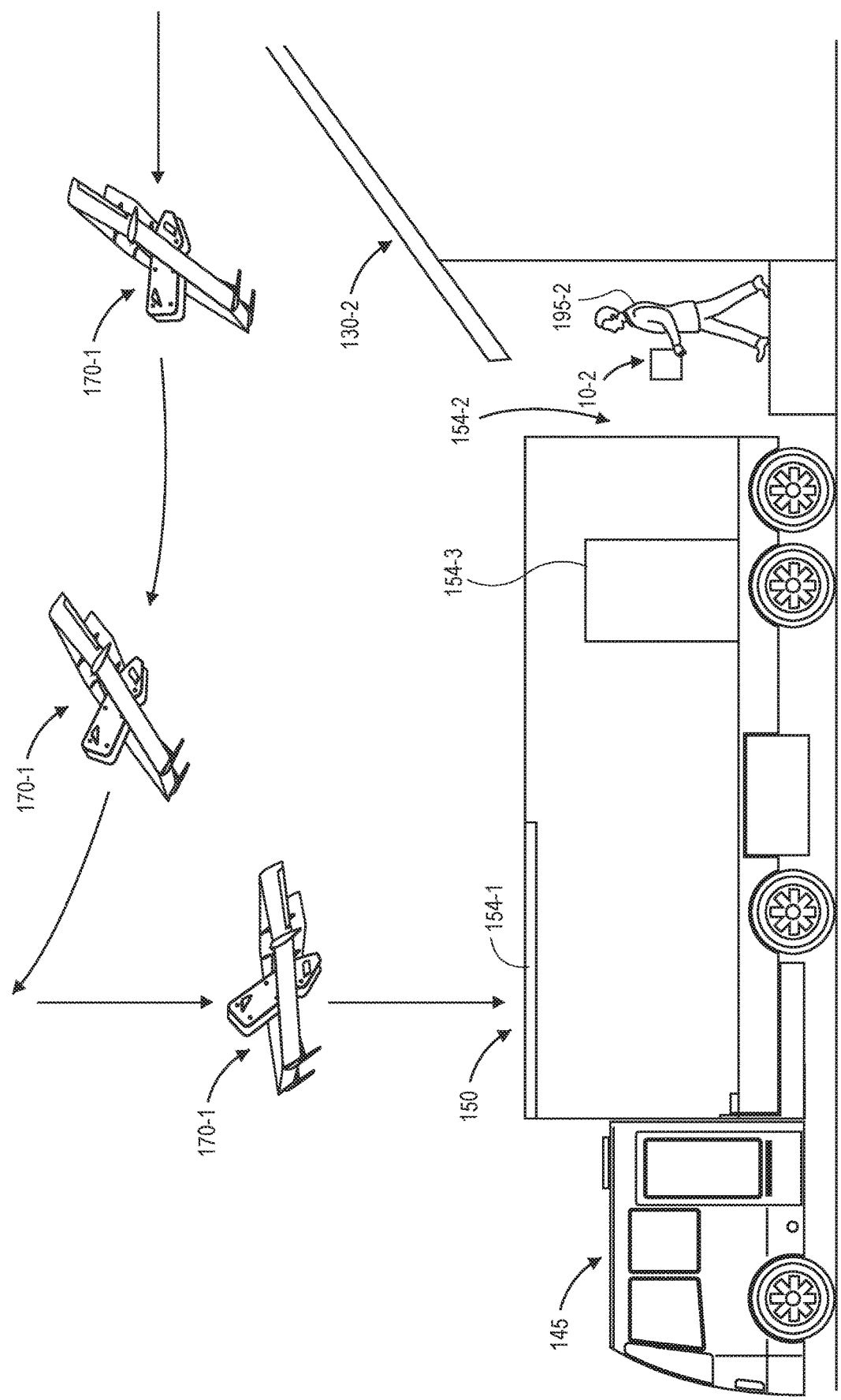

As is shown in FIG. 1G, upon arriving at or near the location of the fulfillment center 130-2, the aerial vehicle 170-1 may operate the one or more motors, propellers, control surfaces or other components to cause the aerial vehicle 170-1 to descend toward the carrier vehicle 150, which is coupled to the powered vehicle 145 and parked outside of and adjacent to a loading station or a distribution station of the fulfillment center 130-2. An associate 195-2 or another human in possession of the item 10-2 is standing by to transfer the item 10-2 into the carrier vehicle 150.

The carrier vehicle 150 may be a trailer or another system designed to accommodate any number or type of objects therein and configured for towing, e.g., by the powered vehicle 145. For example, in some implementations, the carrier vehicle 150 may be a Conestoga trailer, a drop-deck trailer, a dry van (or an enclosed trailer), a flatbed trailer, a lowboy trailer, a refrigerated trailer, a side-kit trailer, a specialty trailer, a step-deck trailer, or any other carrier.

In some implementations, the carrier vehicle 150 may be an intermodal container (e.g., an intermodal freight container, a box container, an International Standards Organization container, or an "ISO container") that may be transferred between rail-based, marine or roadway transportation systems, and may be fixed in place on a transport vehicle (e.g., a well car configured for travel on rails, a container ship, or a trailer).

In some implementations, the powered vehicle 145 may be a road tractor, e.g., a work tractor, a hot rod tractor, or another powered vehicle having one or more motors that are sufficiently powerful to pull, tow or otherwise transport the carrier vehicle 150 to one or more destinations. Alternatively, in some implementations, where the powered vehicle 145 is a van, a truck, or a semi-truck, the carrier vehicle 150 may be a compartment of or associated with the powered vehicle 145, and any references to the carrier vehicle 150 may thus refer to a compartment of the powered vehicle 145.

Figure 1H:
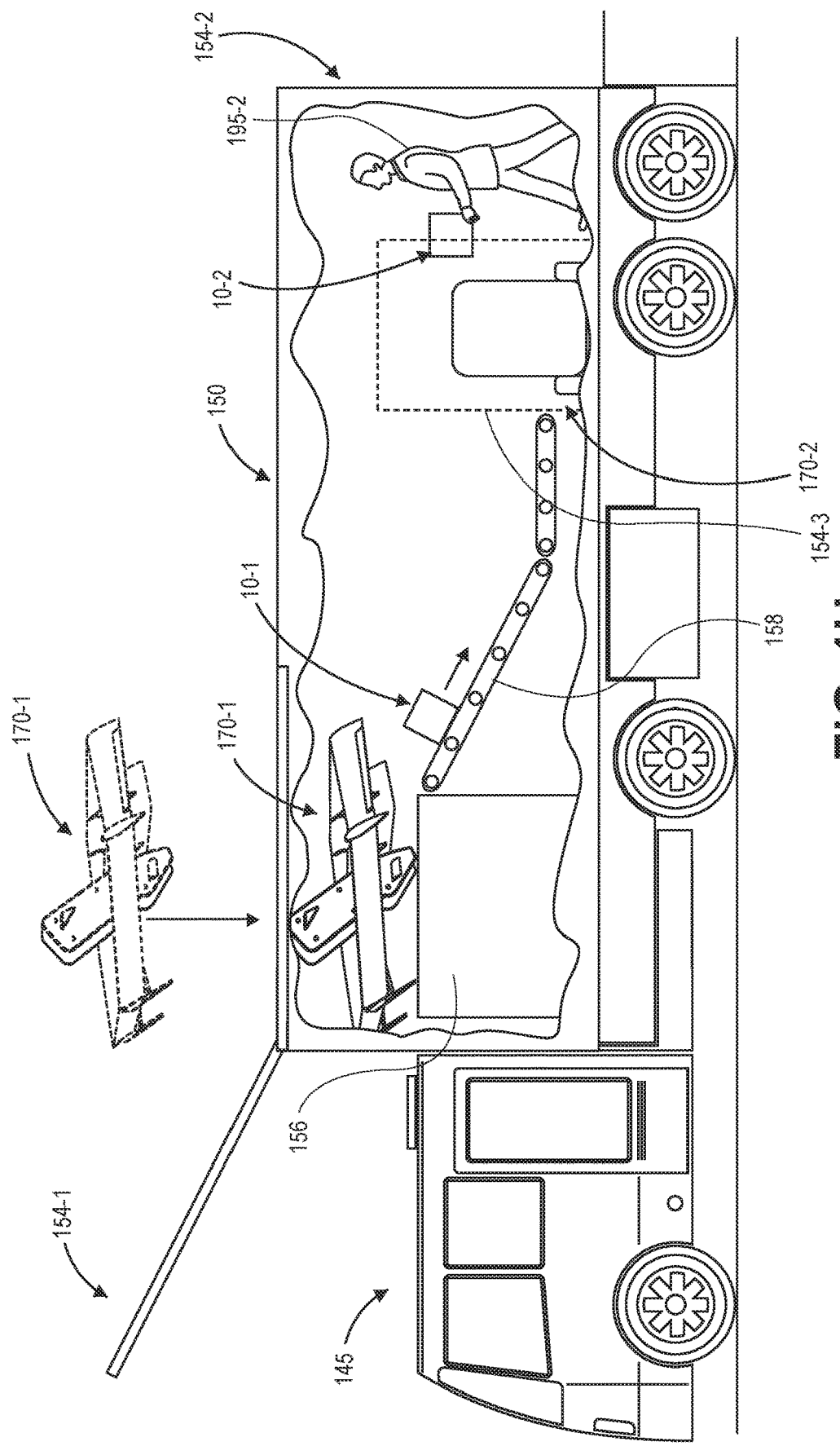

FIG. 1H is a cutaway view of an interior of the carrier vehicle 150. As is shown in FIG. 1H, the aerial vehicle 170-1 includes a ground vehicle (e.g., an autonomous ground vehicle) 170-2 therein. The carrier vehicle 150 further includes a plurality of doors 154-1, 154-2, 154-3 or other access systems, an elevator system 156 configured to descend below or rise above an upper edge or surface of the carrier vehicle 150, and one or more conveyors 158 or other item engagement systems for retrieving or transporting items within the carrier vehicle 150.

The ground vehicle 170-2 may be any ground vehicle that includes one or more power supplies, axles, shafts and/or wheels for causing the ground vehicle 170-2 and any items therein to travel in a desired direction and at a desired speed. The ground vehicle 170-2 may further include a cargo bay or another storage compartment, as well as any number of sensors (e.g., imaging devices or other directional sensors). In some implementations, the ground vehicle 170-2 or the storage compartment thereof may be specifically configured to store or house one or more selected items having any restrictions on temperature, pressure or alignment or orientation, and to protect such items against the elements.

As is shown in FIG. 1H, the aerial vehicle 170-1 may land within an interior compartment of the carrier vehicle 150, e.g., by way of the door 154-1 or another access system. In some implementations, the elevator system 156 may rise above the upper edge or surface of the carrier vehicle 150, engage with the aerial vehicle 170-1, before causing the aerial vehicle 170-1 to descend into the carrier vehicle 150 to a height at which one or more items may be removed from the carrier vehicle 150 or installed therein, e.g., by the associate 195-2 or any other humans or machines. Alternatively, the carrier vehicle 150 need not include the elevator system 156, and the aerial vehicle 170-1 may be configured to descend below or rise above the upper edge or surface of the carrier vehicle 150 under its own power.

The doors 154-1, 154-2, 154-3 may be sectional doors, roll-up doors, sliding doors, tilt-up doors, canopy doors, retractable doors, or any other type or form of doors that may be operated to enable humans or vehicles, e.g., the associate 195-2, the aerial vehicle 170-1 or the ground vehicle 170-2 to access the interior compartment of the carrier vehicle 150. Alternatively, the door 154-1 (or another access system) may be or include a chute, which may include a hinged door or other system, and the aerial vehicle 170-1 may drop or otherwise insert the item 10-1 into the interior compartment of the carrier vehicle 150 by way of the door 154-1. Additionally, the associate 195-2 may further utilize the door 154-2 to access the interior compartment of the carrier vehicle 150, e.g., at a rear of the carrier vehicle 150, such as to retrieve the item 10-1 from the aerial vehicle 170-1, to transfer the item 10-2 into the carrier vehicle 150, or to load the items 10-1, 10-2 into the ground vehicle 170-2.

Thus, as is shown in FIG. 1H, the item 10-1 and the item 10-2 may be transferred into the interior compartment of the carrier vehicle 150, e.g., by landing the aerial vehicle 170-1 within the carrier vehicle 150 and releasing or otherwise removing the item 10-1 therefrom by the associate 195-2 or any other humans or machines. Likewise, once the item 10-1 and the item 10-2 have been transferred into the interior compartment of the carrier vehicle, the item 10-1 and the item 10-2 may likewise be loaded into the ground vehicle 170-2 by the associate 195-2, or by any other humans or machines.

Figure 1I:
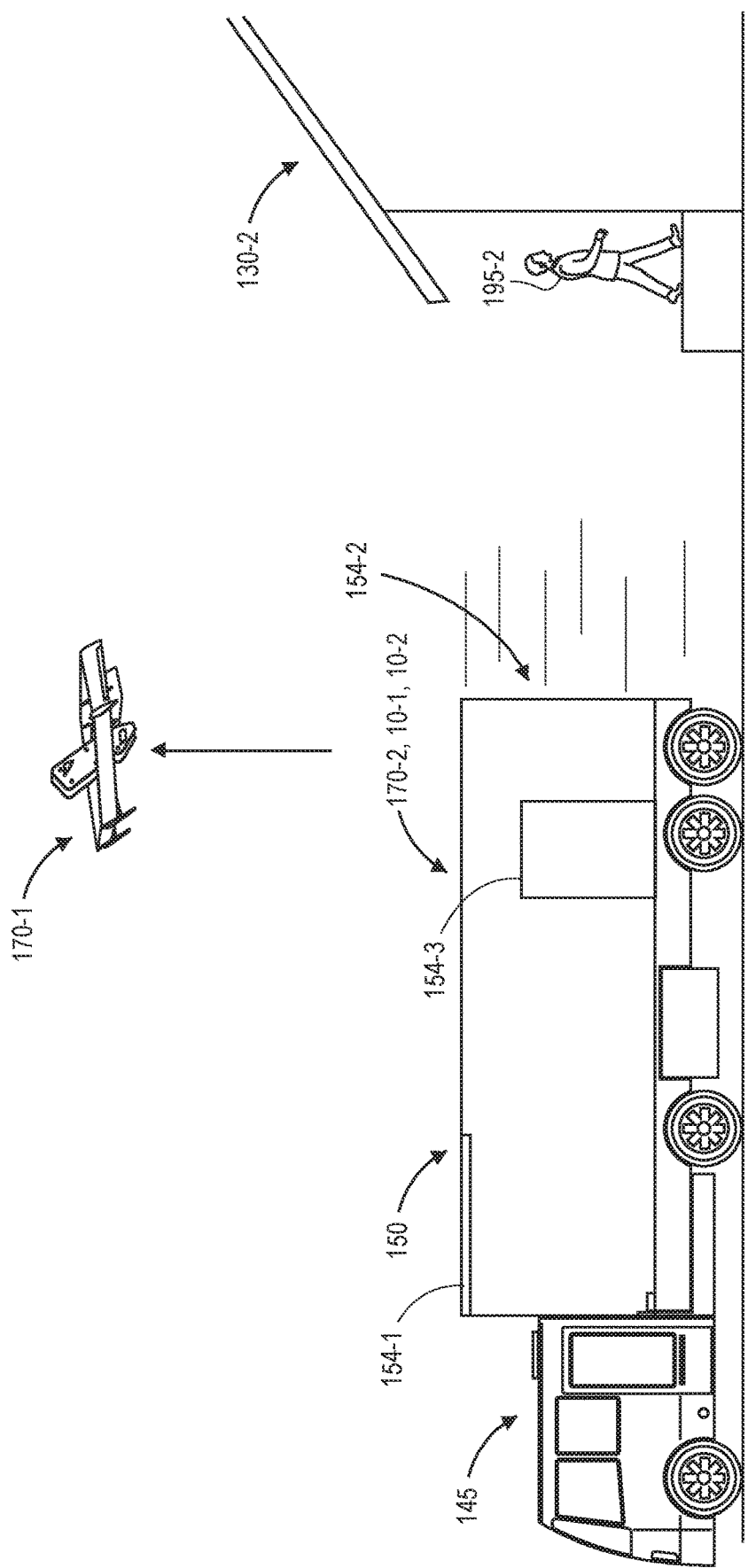

As is shown in FIGS. 1I and 1J, after the item 10-1 and the item 10-2 have been transferred into the interior compartment of the carrier vehicle 150, and loaded into the ground vehicle 170-2, the aerial vehicle 170-1 may take off and depart from the carrier vehicle 150. In some implementations, the aerial vehicle 170-1 may be programmed with coordinates, geolocators or other identifiers of a location of the fulfillment center 130-1, or any other location to which the aerial vehicle 170-1 is to travel next. Likewise, the carrier vehicle 150 may depart from a location of the fulfillment center 130-2, e.g., under tow by the powered vehicle 145, with the ground vehicle 170-2 therein, en route toward the destination 125 specified by the customer 120, as shown in FIG. 1A. In some implementations, the powered vehicle 145 may be operated by one or more humans, who may cause the powered vehicle 145 to travel on one or more courses and at one or more speeds toward the destination 125. In some other implementations, the powered vehicle 145 may be autonomously operated, and programmed with coordinates, geolocators or other identifiers of a location of the destination 125, along with one or more navigation maps or environment maps of a region or an area in which the destination is located, and instructions to travel to the location.

The item 10-1 and the item 10-2 may be loaded into the ground vehicle 170-2 at any time after the items 10-1, 10-2 have been transferred into the carrier vehicle 145 and before the ground vehicle 170-2 departs from the carrier vehicle 145. Likewise, the ground vehicle 170-2 may be programmed with information or data regarding the destination 125 at any time prior to or after the ground vehicle 170-2 departs from the carrier vehicle 145. For example, the ground vehicle 170-2 may be programmed with coordinates, geolocators or other identifiers of a location of the destination 125 or a path thereto prior to or after departing from the carrier vehicle 145, and with updates to such coordinates, geolocators or identifiers or the path thereto, as necessary, even while the ground vehicle 170-2 is en route to the destination 125.

In some implementations, the items 10-1, 10-2 may be loaded into the ground vehicle 170-2 along with any other items, including items ordered by the customer 120, or by other customers. In such implementations, the ground vehicle 170-2 may be further programmed with coordinates, geolocators or other identifiers of locations of destinations for such items, as well as the location of the destination 125, and one or more paths for delivering the items 10-1, 10-2 and such other items. Moreover, the location associated with the destination 125 at which the ground vehicle 170-2 departs from the carrier vehicle 150 may be selected based on any of the locations of destinations for such orders, or a path between such locations, and not merely the location of the destination 125.

Figure 1K:
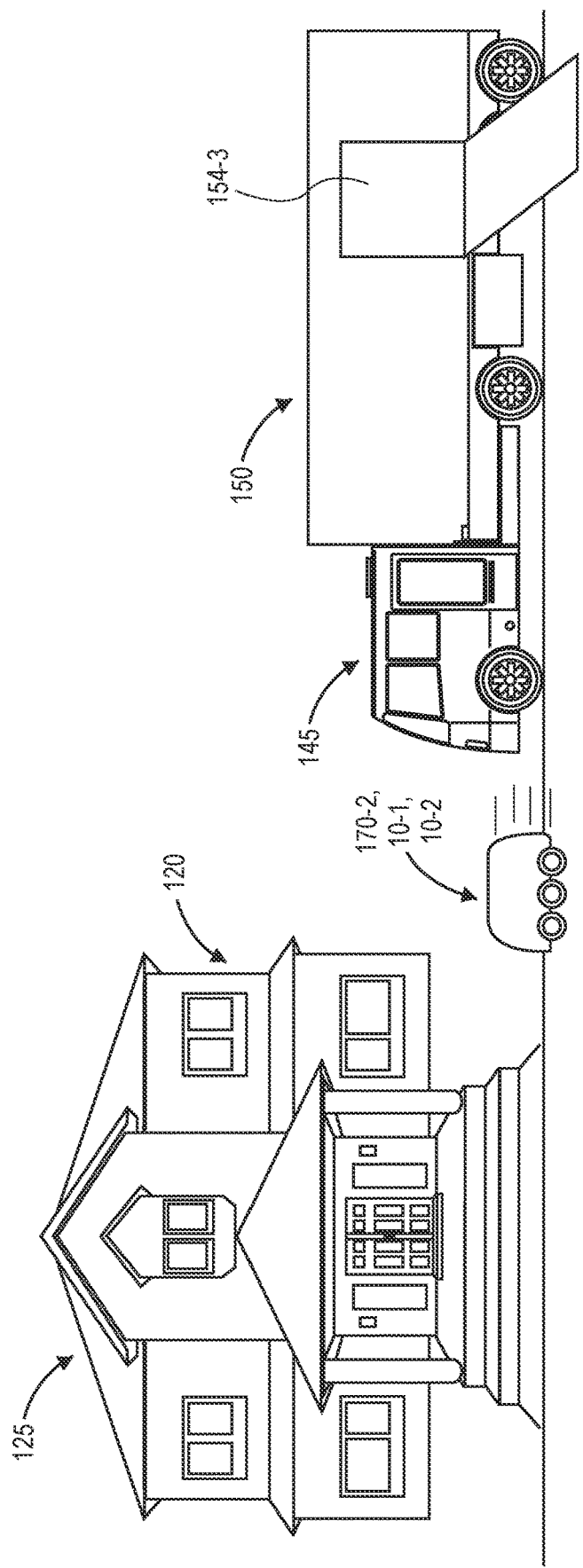

As is shown in FIG. 1K, after the powered vehicle 145 and the carrier vehicle 150 have arrived at the location associated with the destination 125, the ground vehicle 170-2 may depart from the carrier vehicle 150, via the door 154-3 and one or more ramps or other transition surfaces or systems under its own power, e.g., upon executing one or more sets of instructions. For example, the ground vehicle 170-2 may be released by or depart from the carrier vehicle 150, conduct any number of initialization procedures, determine its position and proceed toward a location associated with the destination 125. While traveling toward the location associated with the destination 125, the ground vehicle 170-2 may capture information or data regarding its surroundings by one or more onboard sensors, such as cameras, gyroscopes, accelerometers, magnetometers, compasses or others, and interpret such information or data to select one or more courses or speeds, or to detect and avoid any obstacles, as necessary.

Figure 1L:
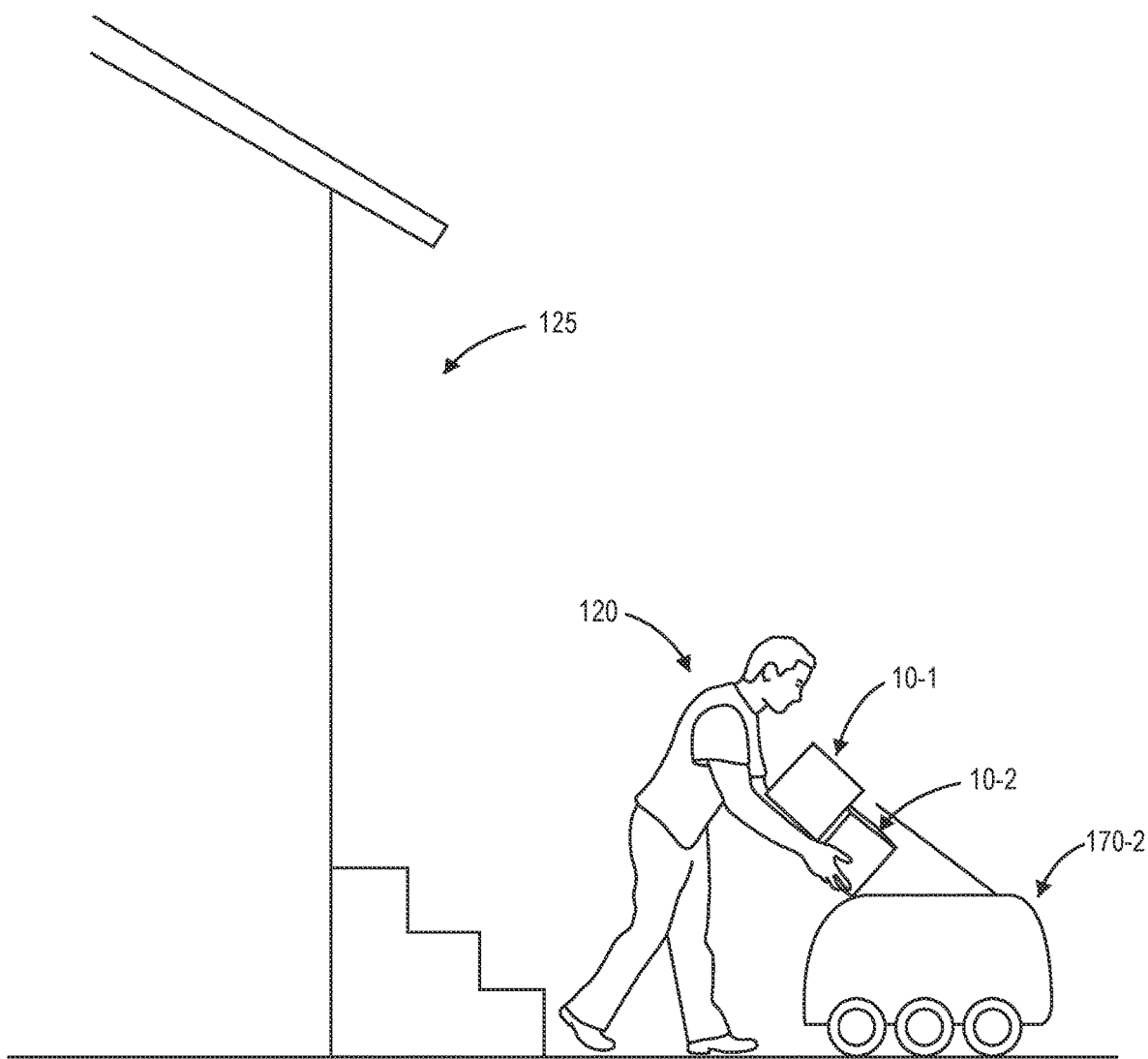

As is shown in FIG. 1L, upon arriving at the destination 125, the ground vehicle 170-2 may operate one or more doors or other access systems to enable the customer 120 to access and retrieve the items 10-1, 10-2 therein. Subsequently, the ground vehicle 170-2 may depart from the destination 125, e.g., to return to the carrier vehicle 150 by way of the door 154-3, or to travel to another location and deliver any items thereto or retrieve any items therefrom, or perform any other tasks or functions.

Accordingly, the systems and methods of the present disclosure are directed to fulfilling orders for multiple items from multiple sources via multimodal channels. Where an order for multiple items is received from a customer, and at least two of the items of the order are available from different sources, an aerial vehicle may transport one of the items from one of the sources to another of the sources, where the item and another item available at that source may be transferred into a carrier vehicle and loaded onto an autonomous ground vehicle, e.g., a robot.

For example, in some implementations, where an order is received for multiple items, sources of the items may be selected on any basis, e.g., proximity to a destination of the order, costs of purchasing or delivering the items, estimated delivery times, or any other basis. One of the items in the order may be picked or retrieved from one of the sources and loaded into a container (e.g., a tote) and singulated, packed or otherwise prepared for delivery, and loaded onto an aerial vehicle (e.g., a drone) for delivery to a location of a carrier vehicle configured to receive the aerial vehicle thereon or therein. In some implementations, the location of the carrier vehicle may be associated with a source of one or more other items in the order. In some other implementations, the location of the carrier vehicle need not be associated with any source of any other items, however. The item may be loaded onto the aerial vehicle independently or with any number of other items that are known or believed to be in demand at the location of the carrier vehicle, e.g., a source of another item in the order.

Upon an arrival of the aerial vehicle at the carrier vehicle, the item may be transferred into an interior compartment of the carrier vehicle and singulated or sorted into an autonomous ground vehicle within the interior compartment. In some implementations, the aerial vehicle may land on or in the carrier vehicle, and the item may be retrieved from the aerial vehicle by one or more humans or machines. In other implementations, the aerial vehicle may hover over the carrier vehicle, and the item may be released from the aerial vehicle at a predetermined altitude above the carrier vehicle and transferred therein. Where the location of the carrier vehicle is associated with a source of items in the order, the autonomous vehicle may also be loaded with items from the source that are also included in the order, as necessary. The carrier vehicle may then be transported to a location associated with the destination, e.g., a location within a region or an area including the destination, such as a neighborhood, a village, or another location. The autonomous vehicle may then depart from the carrier vehicle and deliver the items to the destination before returning to the carrier vehicle, making any number of other deliveries or otherwise performing any other tasks or functions.

The systems and methods of the present disclosure may be scaled, as necessary, to include any number of sources, and any number of carrier vehicles, which may be used to fulfill any number of orders from such sources by transporting items included in such orders to such carrier vehicles, and transporting the carrier vehicles and the items therein to one or more destinations for delivery by autonomous vehicles. A carrier vehicle may include any number of autonomous vehicles therein, and may transport such autonomous vehicles to locations associated with destinations before releasing the autonomous vehicles to deliver ordered items to such destinations.

In this regard, the systems and methods of the present disclosure may effectively expand the size, capacity and diversity of offerings that are available to customers from any one source. For example, where one source proximate a customer includes all but one of the items included in an order placed by the customer, that source may be complemented by a delivery of the missing item, e.g., by aerial vehicle, and all of the items of the order may be transferred into a carrier vehicle and loaded into an autonomous vehicle within the carrier vehicle for delivery to the customer. The systems and methods of the present disclosure may also effectively expand a market for items of any one source. For example, where one source assembles, creates, grows or manufactures specialty items, or items requiring special care or handling, the source may offer such items for sale to customers via an electronic marketplace having access to any number of other sources (e.g., fulfillment centers). When an order for multiple items including one of the specialty items is received from a customer, the specialty item may be transported to a source of the other items in the order, e.g., by aerial vehicle, and all of the items of the order may be transferred into a carrier vehicle and loaded into an autonomous vehicle within the carrier vehicle for delivery to the customer.

The sources of items delivered by systems and methods of the present disclosure may include fulfillment centers, e.g., facilities, warehouses or another like structures that are constructed in distributed, centralized locations and adapted to receive items from other sources of the items, e.g., manufacturers, merchants, sellers, vendors or other fulfillment centers), as well as the manufacturers, merchants, sellers or vendors themselves. For example, and in accordance with implementations of the present disclosure, a "source" may include not only a fulfillment center but also a bookstore, a farm, a grocery store, a hardware store, a package store, or a restaurant, as well as an individual working out of his or her own home or another location, or any other entity. An item that was ordered by a customer and is available at one source may be delivered to another source, where the item and another item available at that source may be transferred into a carrier vehicle, loaded into an autonomous vehicle, and transported to a location within a vicinity of a destination for the order.

Alternatively, an item that was ordered by a customer and is available at a source may be transported to any location of a carrier vehicle by an aerial vehicle and transferred therein, before being transported within the carrier vehicle to a location associated with a destination for the item specified in an order. The location of the carrier vehicle may but need not bear any relation nor have any proximity to another source of any other items included in the order.

Aerial vehicles (such as unmanned aerial vehicles, or drones) of the present disclosure may include any number of sensors such as position sensors (e.g., Global Positioning Satellite or "GPS" receivers, or cellular receivers configured to triangulate positions based on signals received from multiple transmitters), inertial measurement sensors (e.g., accelerometers, gyroscopes, magnetometers or compasses), imaging sensors (e.g., digital cameras or other imaging devices) or any other sensors. Aerial vehicles of the present disclosure may also include communications equipment (e.g., wired or wireless means for communication such as components or systems operating Wi-Fi, Bluetooth®, NFC or cellular technologies or protocols), along with one or more power modules (e.g., batteries), which may be rechargeable, refuelable or replaceable in nature. Information or data obtained or determined by such sensors or such communications equipment may be utilized in manually or automatically controlling an aerial vehicle, e.g., in causing the aerial vehicle to travel along at one or more courses, speeds or altitudes, to select one or more delivery areas, or to perform one or more missions at such areas. The aerial vehicles of the present disclosure may further include any number of computer components (e.g., processors, data stores, transceivers or input/output devices) for performing any of the tasks or executing any of the functions described herein.

When an aerial vehicle is to perform a task at a given location, the aerial vehicle may be programmed with coordinates, geolocations or other identifiers of the location, and programmed to travel by air to the location. Upon arriving at the location, the aerial vehicle may land or otherwise complete a mission at the location, or select one of a plurality of areas for landing or completing the mission, such as by identifying a most convenient, advantageous, suitable or appropriate one of the plurality of areas.

The autonomous vehicles (or ground vehicles) of the present disclosure may be vehicles having any number of wheels mounted to axles that may be rotated by one or more motors, with dimensions, masses or other indicators of size that may be selected on any basis. For example, in some implementations, such autonomous vehicles may be sized and configured to travel on roads at various times or during various levels of congestion, and at various speeds, e.g., in response to one or more computer-based instructions. Alternatively, in other implementations, an autonomous vehicle may be sized and configured to travel on sidewalks, crosswalks, bicycle paths, trails or the like, and at various speeds. In still other implementations, autonomous vehicles may be configured to travel on not only roads but also sidewalks, crosswalks, bicycle paths, trails or the like, at any desired speeds.

Additionally, autonomous vehicles of the present disclosure may include a cargo bay or other storage compartment, or multiple cargo bays or storage compartments, for storing items that are being delivered from an origin to a destination. Such cargo bays or storage compartments may be used to securely maintain items therein at any desired temperature, pressure or alignment or orientation, and to protect such items against the elements. Furthermore, in some implementations, the autonomous vehicles may include various equipment or components for determining whether a cargo bay or other storage compartment is empty or includes one or more items, or for identifying specific items that are stored therein, along with equipment or components for engaging or interacting with such items. The autonomous vehicles may also include one or more display screens (e.g., touchscreen displays, scanners, keypads) having one or more user interfaces for displaying information regarding such vehicles or their contents to humans, or for receiving interactions (e.g., instructions) from such humans, or other input/output devices for such purposes.

Moreover, the autonomous vehicles of the present disclosure may include any number of sensors such as position sensors (e.g., GPS receivers, or cellular transceivers configured to triangulate positions based on signals received from multiple cellular transmitters), imaging sensors (e.g., digital cameras or other imaging devices) or other sensors, including but not limited to speedometers, inclinometers, compasses, altimeters, gyroscopes or scanners. The autonomous vehicles of the present disclosure may also include communications equipment (e.g., wired or wireless means for communication such as components or systems operating Wireless Fidelity, or Wi-Fi, Bluetooth®, near-field communications or cellular technologies or protocols), along with one or more power modules (e.g., batteries), which may be rechargeable, refuelable or replaceable in nature. Information or data obtained or determined by such sensors or such communications equipment may be utilized in manually or automatically controlling an autonomous vehicle, e.g., in causing the autonomous vehicle to travel along one or more paths or routes, to search for alternate paths or routes, or to avoid expected or unexpected hazards encountered by the autonomous vehicle while traveling along such paths or routes. The autonomous vehicles of the present disclosure may further include any number of computer components (e.g., processors, data stores, transceivers or input/output devices) for performing any of the tasks or executing any of the functions described herein.

Referring to FIGS. 2A through 2F, a block diagram of components of one delivery system 200 in accordance with implementations of the present disclosure is shown. The system 200 includes a marketplace 210, a customer 220, a pair of fulfillment centers (or other sources of items) 230-1, 230-2, a carrier vehicle 250, an aerial vehicle 270-1 and a ground vehicle 270-2 that are connected to one another across a network 290, which may include the Internet in whole or in part. Except where otherwise noted, reference numerals preceded by the number "2" in FIGS. 2A through 2F refer to elements that are similar to elements having reference numerals preceded by the number "1" shown in FIGS. 1A through 1L.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores 214 (e.g., databases) for hosting a network site 216. The marketplace 210 may be physically or virtually associated with one or more storage or distribution facilities, such as either of the fulfillment centers 230-1, 230-2, or any facilities associated with other sources of items. The network site 216 may be implemented using the one or more servers 212, which connect or otherwise communicate with the one or more data stores 214 as well as the network 290, through the sending and receiving of digital data. Moreover, the data store 214 may include any type of information regarding items that have been made available for sale through the marketplace 210, or ordered by customers, such as the customer 220, from the marketplace 210, or any information or data regarding the delivery of such items to the customers by any means, including but not limited to the carrier vehicle 250, the aerial vehicle 270-1 or the ground vehicle 270-2.

The fulfillment centers 230-1, 230-2 may be any facility that is adapted to receive, store, process and/or distribute items. As is shown in FIG. 2C, a representative fulfillment center 230-i includes a server 232, a data store 234, and one or more computer processors 236. The representative fulfillment center 230-i also includes stations for receiving, storing and distributing items to customers, including but not limited to a receiving station 231, a storage area 233 and a distribution station 235. Alternatively, or additionally, references to the fulfillment center 230-i or fulfillment centers 230-1, 230-2 herein may also refer to any source of items.

The server 232 and/or the processors 236 may operate one or more order processing and/or communication systems and/or software applications having one or more user interfaces, or communicate with one or more other computing devices or machines that may be connected to the network 290, for transmitting or receiving information in the form of digital or analog data, or for any other purpose. For example, the server 232 and/or the processors 236 may also operate or provide access to one or more reporting systems for receiving or displaying information or data regarding orders for items received by the marketplace 210, or deliveries made by any means, e.g., the carrier vehicle 250, the aerial vehicle 270-1 or the ground vehicle 270-2, and may provide one or more interfaces for receiving interactions (e.g., text, numeric entries or selections) from one or more operators, users, workers or other persons in response to such information or data. The server 232, the data store 234 and/or the processor 236 may be a general-purpose device or machine, or a dedicated device or machine that features any form of input and/or output peripherals such as scanners, readers, keyboards, keypads, touchscreens or like devices, and may further operate or provide access to one or more engines for analyzing the information or data regarding the workflow operations, or the interactions received from the one or more operators, users, workers or persons.

For example, the server 232 and/or the processors 236 may be configured to determine an optimal path or route between two locations for the execution of a given mission or task to be executed by the carrier vehicle 250, the aerial vehicle 270-1 or the ground vehicle 270-2 on any basis, such as according to one or more traditional shortest path or shortest route algorithms such as Dijkstra's Algorithm, Bellman-Ford Algorithm, Floyd-Warshall Algorithm, Johnson's Algorithm or a hub labeling technique.

Additionally, the server 232 and/or the processors 236 may be configured to control or direct, or to recommend or suggest, collaboration between or among one or more of the carrier vehicle 250, the aerial vehicle 270-1 or the ground vehicle 270-2 and any number of other vehicles in the performance of one or more tasks or in the execution of one or more functions. For example, the server 232 and/or the processors 236 may be configured to identify levels of inventory distributed among one or more of the fulfillment centers 230-1, 230-2 or any other sources of items, or aboard other vehicles or in other locations, and to identify an optimal path to be traveled by the carrier vehicle 250, the aerial vehicle 270-1 or the ground vehicle 270-2 in delivering such items to a customer or other destination. Moreover, the server 232 may be configured to provide one or more of the aerial vehicle 270-1 or the ground vehicle 270-2 with one or more sets of instructions for traveling from an origin to a destination, or from the destination to the origin, or for performing any task in accordance with the present disclosure.

Additionally, the server 232 and/or the processor 236 may determine which of a plurality of sources of items, e.g., one of the fulfillment centers 230-1, 230-2, or other sources, is a best source for an item ordered by a customer. The server 232 and/or the processor 236 may also determine which of the carrier vehicle 250, the aerial vehicle 270-1 or the ground vehicle 270-2 is appropriately equipped or best suited to deliver one or more items to a location, including but not limited to their respective proximity to the location, as compared to those of other fulfillment centers or other sources, carrier vehicles, aerial vehicles or autonomous ground vehicles, or on any other relevant factor or basis. The server 232 and/or the processor 236 may select the appropriate departure points and/or rendezvous points where one or more of the carrier vehicle 250, the aerial vehicle 270-1 or the ground vehicle 270-2 may be located in order to timely and properly transfer items therebetween, or for any other purpose. The departure points and/or the rendezvous points may be selected on any basis, including but not limited to a net cost, a net distance or a net time required for a given carrier vehicle 250, a given aerial vehicle 270-1 or a given ground vehicle 270-2 to execute a given task, or on any other basis.

The receiving station 231 may include any apparatuses that may be required in order to receive shipments of items at the fulfillment center **230-*i* from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), as well as one or more of the carrier vehicle 250, the aerial vehicle 270-1 or the ground vehicle 270-2, and preparing such items for storage or distribution to customers. The storage area 233 may include one or more predefined two-dimensional or three-dimensional spaces for accommodating items and/or containers of such items, such as aisles, rows, bays, shelves, slots, bins, racks, tiers, bars, hooks, cubbies or other like storage means, or any other appropriate regions or stations. The distribution station 235 may include one or more regions or stations where items that have been retrieved from a designated storage area may be evaluated, prepared and packed for delivery from the fulfillment center 230-*i* to locations or destinations specified by customers, e.g., by way of one or more of the carrier vehicle 250, the aerial vehicle 270-1 or the ground vehicle 270-2, or any other vehicle of any type, e.g., cars, trucks, trailers, freight cars, container ships or cargo aircraft (e.g., manned aircraft or unmanned aircraft, such as drones). Such locations or destinations may include, but are not limited to, facilities having specific addresses or other geocoded identifiers (e.g., dwellings or businesses), as well as storage lockers or other temporary storage or receiving facilities. Those of ordinary skill in the pertinent art will recognize that shipments of items arriving at the receiving station 231 may be processed, and the items placed into storage within the storage areas 233 or, alternatively, transferred directly to the distribution station 235**, or "cross-docked," for prompt delivery to one or more customers.

The fulfillment center **230-*i* may further include one or more control systems that may generate instructions for conducting operations at one or more of the receiving station 231, the storage area 233 or the distribution station 235. Such control systems may be associated with the server 232, the data store 234 and/or the processor 236, or with one or more other computing devices or machines, and may communicate with the receiving station 231, the storage area 233 or the distribution station 235 within the fulfillment center 230-*i* by any known wired or wireless means, or with the marketplace 210, the customer 220 or one or more of the carrier vehicle 250, the aerial vehicle 270-1 or the ground vehicle 270-2 over the network 290**, through the sending and receiving of digital data.

Additionally, the fulfillment center **230-*i* may include one or more systems or devices (not shown in FIGS. 2A through 2F) for determining locations of one or more elements therein, such as cameras or other image recording devices. Furthermore, the fulfillment center 230-*i* may also include one or more associates or other humans or workers (not shown in FIGS. 2A through 2F), who may handle or transport items within the fulfillment center 230. Such associates may operate one or more computing devices or machines for registering the receipt, retrieval, transportation or storage of items within the fulfillment center 230-*i***, or a general-purpose device such as a mobile device, a tablet computer, a smartphone, a desktop computer or a laptop computer, and may include any form of input and/or output peripherals such as scanners, readers, keyboards, keypads, touchscreens or like devices.

The customer 220 may be any entity or individual that wishes to download, purchase, rent, lease, borrow or otherwise obtain items (which may include goods, products, services or information of any type or form) from the marketplace 210, e.g., for delivery by the ground vehicle 270-2 or any other means. As is shown in FIG. 2B, the customer 220 may utilize one or more computing devices 222 (e.g., a smartphone, a tablet computer, a laptop computer, a desktop computer, or computing devices provided in wristwatches, televisions, set-top boxes, automobiles or any other appliances or machines), or any other like machine, that may operate or access one or more software applications 224, such as a web browser or a shopping application, and may be connected to or otherwise communicate with the marketplace 210, the fulfillment center 230, or one or more of the carrier vehicle 250, the aerial vehicle 270-1 or the ground vehicle 270-2 through the network 290, by the transmission and receipt of digital data.

The powered vehicle 245 may be configured for direct or indirect coupling to the carrier vehicle 250. In some implementations, the powered vehicle 245 may be any type of road vehicle (e.g., cars, trucks, tractors and/or trailers, vans, or the like), as well as vehicles configured for travel via other forms or modes of transit (e.g., trains, locomotives, seagoing vessels, or others) powered by any type or form of power source and/or prime mover. For example, the powered vehicle 245 may receive power by any manner and in any form, including but not limited to any form of petroleum-based power, e.g., gasoline, diesel fuel, natural gas and/or propane, as well as electrical power such as alternating current (AC) power, direct current (DC) power, solar power, geothermal power, wind power, nuclear power, fuel cells, or others.

Figure 2A:
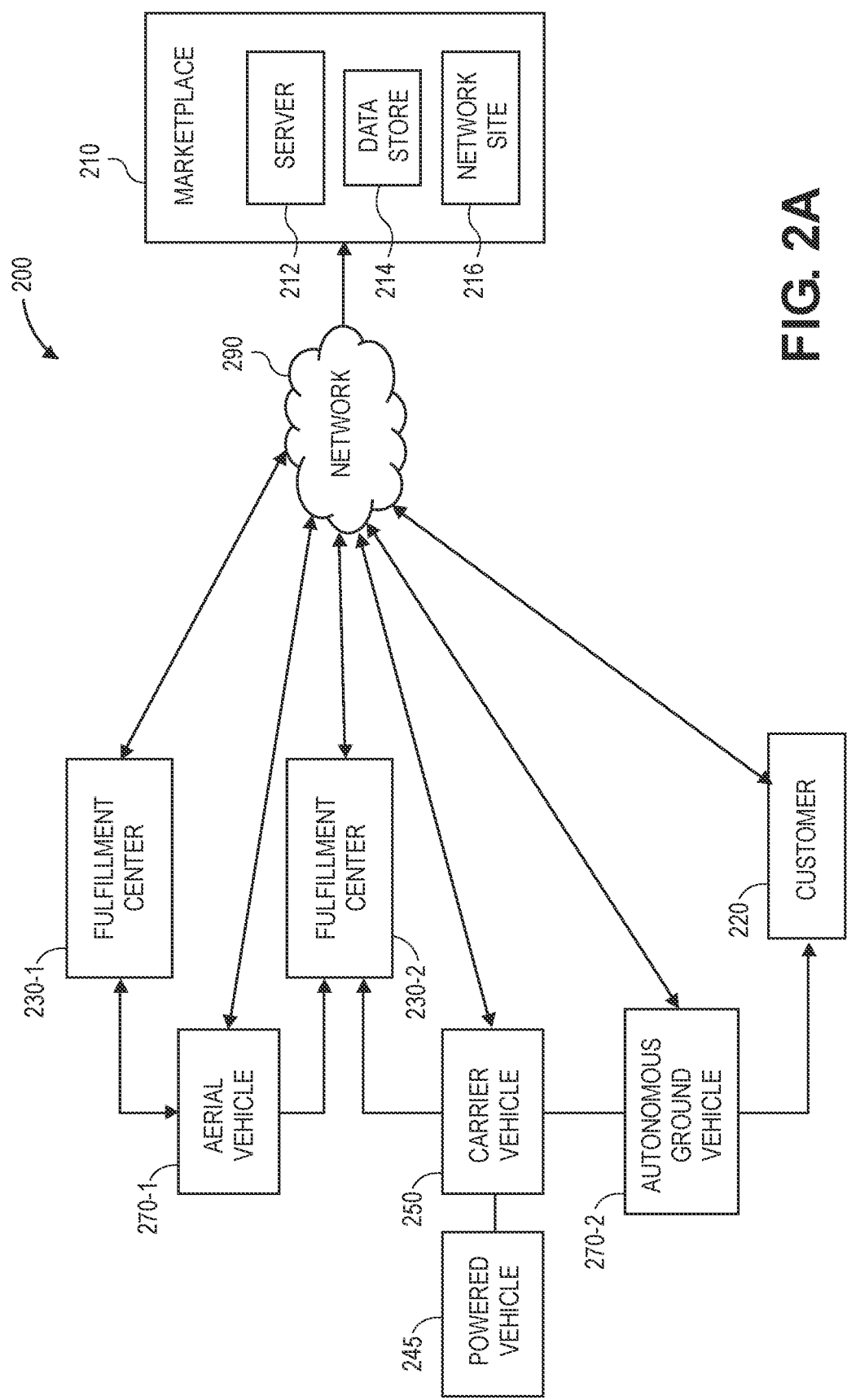

The carrier vehicle 250 may be any vehicle or vessel configured to carry one or more items and/or autonomous ground vehicles. The carrier vehicle 250 may be fixedly or releasably coupled to the powered vehicle 245, and configured to retrieve and/or launch aerial vehicles at a fixed location or while in transit. As is shown in FIG. 2A, the carrier vehicle 250 includes one or more launch and retrieval mechanisms 252, one or more doors 254 or other access points, one or more sensors 255, one or more conveyors 256 and one or more item engagement systems 258. Alternatively, in some implementations, the powered vehicle 245 and the carrier vehicle 250 may be a single vehicle, e.g., a van or a semi-truck.

The launch and retrieval mechanisms 252 may include one or more elevators, pulleys, lifts, catapults or other components for raising, lowering and/or rotating the aerial vehicle 270-1 or the ground vehicle 270-2, or for otherwise placing the aerial vehicle 270-1 or the ground vehicle 270-2 in a desired position and/or orientation within a compartment of the carrier vehicle 250. Additionally, the launch and retrieval mechanisms 252 may include one or more conveyors for causing the aerial vehicle 270-1 or the ground vehicle 270-2 to travel in one or more directions thereon, or for orienting the aerial vehicle 270-1 or the ground vehicle 270-2 to receive one or more items in a cargo bay or compartment.

The doors 254 are any motorized or manually operated systems that may be automatically opened and/or closed to provide or restrict access to a compartment defined by the carrier vehicle 250. The doors 254 may include any number of manual or automatic features for causing the opening or closing thereof, and may have any suitable dimensions with respect to the dimensions of the compartment, the aerial vehicle 270-1 or the ground vehicle 270-2. The doors 254 may be disposed on an upper surface (e.g., a roof and/or ceiling of the compartment) of the carrier vehicle 250, on a left side or a right side of the carrier vehicle 250, on a rear side of the carrier vehicle 250, below or beneath the carrier vehicle 250, or in any other location or orientation with respect to the carrier vehicle 250. In some implementations, the doors 254 may be rotatably connected to one or more aspects of the carrier vehicle 250 by a pair of hinges. In other implementations, the doors 254 may take the form of one or more slidable or rollable (e.g., roll-top, roll-up or roll-back) doors having one or more shafts, bearings, adaptor rings, guide rails and/or slats for guiding the doors 254 during opening and/or closing operations. For example, in some implementations, the carrier vehicle 250 may include a single door 254 that is configured to open in a single direction, e.g., by sliding, swinging or translating from left to right, from right to left, from forward aft or from aft forward. In other implementations, the carrier vehicle 250 may include two or more doors 254 that may open in a split fashion, i.e., with one door 254 sliding, swinging or translating in one direction from an intersection point and another door 254 sliding, swinging or translating in an opposite direction from the intersection point.

The sensors 255 may include one or more position sensors (e.g., Global Positioning Satellite system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 255 may include any number of memory or storage components and processors, photosensitive surfaces, filters, chips, electrodes, clocks, boards, timers or any other relevant features (not shown) for aiding in their operation.

For example, one or more of the sensors 255 may be an imaging device including any form of optical recording sensor or device (e.g., digital cameras, depth sensors or range cameras, infrared cameras, radiographic cameras or other optical sensors) that may be configured to photograph or otherwise capture visual information or data (e.g., still or moving images in color or black and white that may be captured at any frame rates, or depth imaging data such as ranges), or associated audio information or data, or metadata, regarding objects or activities occurring within a vicinity of the carrier vehicle 250, or for any other purpose. For example, a sensor 255 may be configured to capture or detect reflected light if the reflected light is within a field of view of the sensor 255, which is defined as a function of a distance between an imaging sensor and a lens within the sensor 255, viz., a focal length, as well as a location of the sensor 255 and an angular orientation of the lens. Accordingly, where an object appears within a depth of field, or a distance within the field of view where the clarity and focus is sufficiently sharp, the sensor 255 may capture light that is reflected off objects of any kind to a sufficiently high degree of resolution using one or more sensors thereof, and store information regarding the reflected light in one or more data files.

The sensors 255 may also include manual or automatic features for modifying a field of view or orientation. For example, one or more of the sensors 255 may be a digital camera configured in a fixed position, or with a fixed focal length (e.g., fixed-focus lenses) or angular orientation. Alternatively, one or more of the sensors 255 may include one or more actuated or motorized features for adjusting a position of a sensor 255, or for adjusting either the focal length (e.g., zooming the imaging device) or the angular orientation (e.g., the roll angle, the pitch angle or the yaw angle), by causing a change in the distance between the imaging sensor and the lens (e.g., optical zoom lenses or digital zoom lenses), a change in the location of the sensor 255, or a change in one or more of the angles defining the angular orientation of the sensor 255.

In some implementations, imaging data (e.g., still or moving images, as well as associated audio data or metadata) captured using the sensor 255 may be processed according to any number of recognition techniques. Objects or portions of objects detected within imaging data may be stationary or in motion, and may be identified at single, finite periods of time, or over one or more periods or durations. Moreover, the sensors 255 may further include one or more compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), accelerometers, ranging sensors (e.g., radar or LIDAR ranging sensors) or sound sensors (e.g., microphones, piezoelectric sensors, vibration sensors or other transducers for detecting and recording acoustic energy from one or more directions).

One or more of the sensors 255 may be further configured to capture, record and/or analyze information or data regarding its positions, velocities, accelerations or orientations of the carrier vehicle 250, and to analyze such data or information by one or more means, e.g., by aggregating or summing such data or information to form one or more qualitative or quantitative metrics of the movement of the sensor 255 and/or the carrier vehicle 250. For example, a net vector indicative of any and all relevant movements of the carrier vehicle 250, including but not limited to physical positions, velocities, accelerations or orientations of the carrier vehicle 250, may be derived based on information or data captured by the sensor 255. Additionally, coefficients or scalars indicative of the relative movements of the carrier vehicle 250 may also be defined based on such information or data.

The conveyors 256 may be any component or system for moving or translating objects, items or materials of varying sizes and shapes within the carrier vehicle 250, into the carrier vehicle 250, or out of the carrier vehicle 250. The conveyors 256 may include any number of machines or elements for causing the motion or translation of such objects, items or materials from one location to another. For example, the machines or elements that cause or enable such motion or translation by the conveyors 256 may be driven by any form of mover, including belts, chains, screws, tracks or rollers, and the objects, items or materials may be transported in a container or carrier, or on or within the mover itself. The conveyors 256 may further include one or more pulleys, shafts, hubs, bushings, sprockets, bearings and other elements for causing a motion or translation. Further, the conveyors 256 may convey objects, items or materials from or into one or more static or dynamic apparatuses, such as a bin, a chute, a cart, a truck or another like machine. The conveyors 256 may further include controllers for causing or controlling the operation of the conveyors 256, and the motion or the translation of objects thereon from one location to another. In some implementations, the conveyors 256 may include a conveyor belt, viz., a banded continuous-loop belt (e.g., rubber or fabric) that is placed into motion by a series of two or more pulleys, at least one of which is driven by a motor. Objects, items or materials may be placed directly onto such a belt, or into one or more bins or like containers that may be placed on the belt. Similarly, the conveyors 256 may commonly include a chain conveyor having one or more pendants, which may be used to pull unit loads on pallets or in other large-scale containers. The conveyors 256 may also include a gravity conveyor, which may consist of a series of rollers that may be used to move objects based on a difference in height, and a resulting difference in gravitational potential energy, without the use of a motor.

The engagement systems 258 may be any mechanical components, e.g., robotic arms, cable robots, cranes or other systems, for engaging or disengaging items within the carrier vehicle 250, or for loading items into or removing items from the aerial vehicle 270-1 or the autonomous vehicle 270-2, as desired. For example, when the aerial vehicle 270-1 is tasked with delivering an item from a source, e.g., one of the fulfillment centers 230-1, 230-2 or elsewhere, to the carrier vehicle 250, the engagement system 258 may engage the item outside of or within the carrier vehicle 250, or deposit the item in a cargo bay or other storage compartment of the ground vehicle 270-2. The engagement system 258 may further engage with any item obtained from any other source, outside of or within the carrier vehicle 250, or deposit that item in a cargo bay or other storage compartment of the ground vehicle 270-2.

The engagement systems 258 may include any number of controllers, arms, beams, blocks, cables, drive systems, end effectors, frames, girders, hooks, rails, ropes, sensors and/or tracks for identifying locations of one or more items within the carrier vehicle 250, engaging one or more of the items at such locations, delivering such items to or from the aerial vehicle 270-1 or the ground vehicle 270-2, or any other location within the carrier vehicle 250, and depositing or installing such items within the aerial vehicle 270-1 or the ground vehicle 270-2 either directly or by way of one or more conveyors or other systems.

In some implementations, the carrier vehicle 250 may also include any number of environmental controls, such as ducts, vents, intakes or outlets that enable air flow to enter the carrier vehicle 250, to travel therethrough at desired velocities and/or pressures, or to exit the carrier vehicle 250. Such environmental controls may include any number of heaters, chillers, humidifiers, dehumidifiers or any other systems for achieving a desired environmental condition (e.g., temperature, humidity) within the compartment defined by the carrier vehicle 250.

In some implementations, the carrier vehicle 250 may be formed from one or more structural vessels having standard sizes and/or shapes, having the launch and retrieval mechanisms 252, the doors 254, the sensors 255, the conveyors 256 and/or the item engagement systems 258 installed therein. The carrier vehicle 250 may also include any number of computer processors, data stores, memory components or communications equipment for controlling the operation of the launch and retrieval mechanism 252, the doors 254, the sensors 255, the conveyors 256 and/or the engagement system 258, or for receiving instructions for the operation thereof.

As is shown in FIG. 2E, the aerial vehicle 270-1 includes a processor 272-1, a memory 274-1 and a transceiver 276-1, as well as a control system 280-1, one or more propulsion motors 281-1, one or more control surfaces 283-1, one or more item engagement systems 285-1, one or more sensors 282-1, one or more power modules 284-1, and one or more navigation modules 286-1.

The processor 272-1 may be configured to perform any type or form of computing function, including but not limited to the execution of one or more machine learning algorithms or techniques. For example, the processor 272-1 may control any aspects of the operation of the aerial vehicle 270-1 and the one or more computer-based components thereon, including but not limited to the propulsion motors 281-1, the control surfaces 283-1, the item engagement systems 285-1, the sensors 282-1, the power modules 284-1 and/or the navigation modules 286-1.

The processor 272-1 may be a uniprocessor system including one processor, or a multiprocessor system including several processors (e.g., two, four, eight, or another suitable number), and may be capable of executing instructions. For example, in some implementations, the processor 272-1 may be a general-purpose or embedded processor implementing any of a number of instruction set architectures (ISAs), such as the x86, PowerPC, SPARC, or MIPS ISAs, or any other suitable ISA. Where the processor 272-1 is a multiprocessor system, each of the processors within the multiprocessor system may operate the same ISA, or different ISAs.

The aerial vehicle 270-1 further includes one or more memory or storage components 274-1 (such as databases or data stores) for storing any type of information or data, e.g., instructions for operating the aerial vehicle 270-1, or information or data captured during operations of the aerial vehicle 270-1. Additionally, the memory 274-1 may be configured to store executable instructions, flight paths, flight control parameters and/or other data items accessible by or to the processor 272-1. The memory 274-1 may be implemented using any suitable memory technology, such as static random access memory (SRAM), synchronous dynamic RAM (SDRAM), nonvolatile/Flash-type memory, or any other type of memory. In some implementations, program instructions, flight paths, flight control parameters and/or other data items may be received or sent via the transceiver 276-1, e.g., by transmission media or signals, such as electrical, electromagnetic, or digital signals, which may be conveyed via a communication medium such as a wired and/or a wireless link.

The transceiver 276-1 may be configured to enable the aerial vehicle 270-1 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 276-1 may further include or be in communication with one or more input/output (or "I/O") interfaces, network interfaces and/or input/output devices, and may be configured to allow information or data to be exchanged between one or more of the components of the aerial vehicle 270-1, or to one or more other computer devices or systems (e.g., other aerial vehicles, not shown) via the network 290. For example, in some implementations, the transceiver 276-1 may be configured to coordinate I/O traffic between the processor 272-1 and one or more onboard or external computer devices or components. The transceiver 276-1 may perform any necessary protocol, timing or other data transformations in order to convert data signals from a first format suitable for use by one component into a second format suitable for use by another component. In some implementations, the transceiver 276-1 may include support for devices attached through various types of peripheral buses, e.g., variants of the Peripheral Component Interconnect (PCI) bus standard or the Universal Serial Bus (USB) standard. In some other implementations, functions of the transceiver 276-1 may be split into two or more separate components, or incorporated directly into the processor 272-1.

In some implementations, the transceiver 276-1 may transmit and/or receive signals according to the Bluetooth® Low Energy, e.g., within a frequency spectrum of approximately 2.4000 to 2.4835 gigahertz (GHz), and in two-megahertz (2 MHz) channels, or according to the Ultra Wideband standard, e.g., within a frequency spectrum of approximately 3.1 to 10.6 gigahertz (GHz), with bandwidths of at least five hundred megahertz (500 MHz), or at least twenty percent of a center frequency. The transceiver 276-1 may include any number of processors, chips (e.g., chipsets) or other components that are commonly associated with or required for communication according to a selected communications protocol or standard, or programmed as necessary (e.g., with one or more applications and/or sets of instructions) in order to communicate according to the selected protocol or standard. The signals transmitted and/or received by the transceiver 276-1 may be of any kind or type, and may be sent over the network 290, or directly to one or more of the computing device 222 of the customer 220, to the server 232, the carrier vehicle 250 and/or the ground vehicle 270-2, or to other aerial vehicles (not shown).

The control system 280-1 may include one or more software applications or hardware components configured for controlling or monitoring operations of one or more components such as the propulsion motors 281-1, the control surfaces 283-1, the item engagement systems 285-1, the sensors 282-1, the power modules 284-1 and/or the navigation modules 286-1, e.g., by receiving, generating, storing and/or transmitting one or more computer instructions to such components. The control system 280-1 may communicate with the marketplace 210, the customer 220, the fulfillment centers 230-1, 230-2, the carrier vehicle 250 or the ground vehicle 270-2 over the network 290, through the sending and receiving of digital data. In some implementations, the control system 280-1 may be integrated with or include the processor 272-1.

The propulsion motors 281-1 may be any type or form of motor (e.g., electric, gasoline-powered or any other type of motor) capable of generating sufficient rotational speeds of one or more propellers or other components to provide lift and/or thrust forces to the aerial vehicle 270-1 and any engaged payload, and to aerially transport the engaged payload thereby. For example, one or more of the propulsion motors 281-1 may be a brushless direct current (DC) motor such as an outrunner brushless motor or an inrunner brushless motor. The aerial vehicle 270-1 may include any number of such propulsion motors 281-1 of any kind. For example, one or more of the motors 281-1 may be aligned or configured to provide forces of lift to the aerial vehicle 270-1, exclusively, while one or more of the propulsion motors 281-1 may be aligned or configured to provide forces of thrust to the aerial vehicle 270-1, exclusively. Alternatively, one or more of the propulsion motors 281-1 may be aligned or configured to provide forces of lift and forces of thrust to the aerial vehicle 270-1, as needed. For example, the propulsion motors 281-1 may be fixed in their orientation on the aerial vehicle 270-1, or configured to vary their respective orientations, e.g., a tilt-rotor aircraft. Moreover, the propulsion motors 281-1 may be aligned or configured to operate with different capacities or ratings, or at different speeds, or coupled to propellers having different sizes and shapes.

The control surfaces 283-1 may be one or more fixed or movable (e.g., repositionable or reorientable) control surfaces such as wings, rudders, ailerons, elevators, flaps, brakes or slats, or other features for controlling or changing a course, an altitude or an attitude (e.g., a yaw, a pitch or a roll) of the aerial vehicle 270-1.

The item engagement systems 285-1 may be any mechanical component, e.g., a robotic arm, for engaging an item or for disengaging the item, as desired. For example, when the aerial vehicle 270-1 is tasked with delivering items to the carrier vehicle 250, the item engagement system 285-1 may receive an item from a source, e.g., one of the fulfillment centers 230-1, 230-2 or elsewhere, load or maintain the item within the aerial vehicle 270-1, and travel to a location of the carrier vehicle 250 with the item therein. The item engagement systems 285-1 may then be used to deposit the item at the location, and to, optionally, engage with any other items prior to departing from the carrier vehicle 250. The item engagement systems 285-1 may include any number of controllers, arms, blocks, cables, drive systems, end effectors, frames, rails, ropes, sensors and/or tracks for receiving one or more items, repositioning the one or more items within the aerial vehicle 270-1, or depositing the one or more items at a desired location.

The sensors 282-1 may be any components or other features for capturing information or data during the operation of the aerial vehicle 270-1, including but not limited to one or more position sensors (e.g., GPS system receivers, accelerometers, compasses, gyroscopes, altimeters), imaging devices (e.g., digital cameras, depth sensors, range cameras, infrared cameras, radiographic cameras or other optical sensors), speedometers (e.g., anemometers), thermometers, barometers, hygrometers, air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), attitude indicators, depth gauges or sound sensors (e.g., microphones, piezoelectric sensors, vibration sensors or other transducers for detecting and recording acoustic energy from one or more directions). The sensors 282-1 may include any number of memory or storage components and processors, photosensitive surfaces, filters, chips, electrodes, clocks, boards, timers or any other relevant features (not shown) for aiding in their operation.

The power modules 284-1 may be any type of power source for providing electrical power, mechanical power or other forms of power in support of one or more electrical or mechanical loads aboard the aerial vehicle 270-1. In some implementations, the power modules 284-1 may include one or more batteries or other power cells, e.g., dry cell or wet cell batteries such as lead-acid batteries, lithium ion batteries, nickel cadmium batteries or nickel metal hydride batteries, or any other type, size or form of batteries. The power modules 284-1 may each have any cell voltages, peak load currents, charge times, specific energies, internal resistances or cycle lives, or other power ratings. The power modules 284-1 may also be any type, size or form of other power source, e.g., other than a battery, including but not limited to one or more fuel cells, turbines, solar cells or nuclear reactors. Alternatively, the power modules 284-1 may be another form of prime mover (e.g., electric, gasoline-powered or any other type of motor) capable of generating sufficient mechanical forces for the aerial vehicle 270-1.

The navigation modules 286-1 may include one or more software applications or hardware components including or having access to information or data regarding aspects of transportation systems within a given region, including the locations, dimensions, capacities, conditions, statuses or other attributes of various paths or routes in the region (e.g., one or more sets of rails, roads or shipping channels). For example, the navigation modules 286-1 may receive inputs from the sensors 282-1, e.g., from a GPS receiver, an imaging device or another sensor, and determine an optimal direction and/or an optimal speed of the aerial vehicle 270-1 for travelling on a given path or route based on such inputs. The navigation modules 286-1 may select a path or route to be traveled by the aerial vehicle 270-1, and may provide information or data regarding the selected path or route to the control system 280-1.

As is shown in FIG. 2F, the ground vehicle 270-2 may be an autonomous ground vehicle or any ground vehicle that includes one or more power supplies, axles, shafts and/or wheels for causing the ground vehicle 270-2 and any items therein to travel on one or more ground surfaces in a desired direction and at a desired speed. The ground vehicle 270-2 may include a processor 272-2, a memory 274-2 and a transceiver 276-2, as well as a control system 280-2, one or more propulsion motors 281-2, one or more item engagement systems 285-2, one or more sensors 282-2, one or more power modules 284-2, and one or more navigation modules 286-2. The processor 272-2, the memory 274-2, the transceiver 276-2, the control system 280-2, the propulsion motors 281-2, the item engagement systems 285-2, the sensors 282-2, the power modules 284-2 and the navigation modules 286-2 may share one or more attributes, properties or features in common with the processor 272-1, the memory 274-1, the transceiver 276-1, the control system 280-1, the propulsion motors 281-1, the item engagement systems 285-1, the sensors 282-1, the power modules 284-1, and the navigation modules 286-1 of the aerial vehicle 270-1, or may have one or more different or other attributes, properties or features. The ground vehicle 270-2 may further include a cargo bay or another storage compartment, which may be specifically configured to store or house one or more selected items having any restrictions on temperature, pressure or alignment or orientation, and to protect such items against the elements.

Although the block diagrams of FIGS. 2A through 2F include single boxes corresponding to the marketplace 210, the customer 220, the powered vehicle 245, the carrier vehicle 250, the aerial vehicle 270-1 and the ground vehicle 270-2, and two boxes for the fulfillment centers 230-1, 230-2, those of ordinary skill in the pertinent arts will recognize that the system 200 may include any number of marketplaces, fulfillment centers, customers, powered vehicles, carrier vehicles, aerial vehicles and/or ground vehicles for performing one or more of the operations disclosed herein, each of which may include features that are identical to one another, or may be customized in any manner.

Any combination of networks or communications protocols may be utilized in accordance with the systems and methods of the present disclosure. For example, each of the marketplace 210, the customer 220, the fulfillment centers 230-1, 230-2, the carrier vehicle 250, the aerial vehicle 270-1 and the ground vehicle 270-2 may be configured to communicate with one another via the network 290, such as is shown in FIG. 2A, e.g., via an open or standard protocol such as Wi-Fi. Alternatively, each of the marketplace 210, the customer 220, the fulfillment centers 230-1, 230-2, the carrier vehicle 250, the aerial vehicle 270-1 and the ground vehicle 270-2 may be configured to communicate with one another directly outside of a centralized network, such as the network 290, e.g., by a wireless protocol such as Bluetooth®, in which two or more of the marketplace 210, the customer 220, the fulfillment centers 230-1, 230-2, the carrier vehicle 250, the aerial vehicle 270-1 and the ground vehicle 270-2 may be paired with one another.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "customer," a "fulfillment center" (or a "source"), a "powered vehicle," a "carrier vehicle," an "aerial vehicle," a "ground vehicle," or like terms, may be automated steps performed by their respective computer systems, or implemented within software modules (or computer programs) executed by one or more general purpose computers. Moreover, process steps described as being performed by a "marketplace," a "customer," a "fulfillment center" (or a "source"), a "powered vehicle," a "carrier vehicle," an "aerial vehicle," a "ground vehicle," or like terms, may be typically performed by a human operator, but could, alternatively, be performed by an automated agent.

The marketplace 210, the customer 220, the fulfillment centers 230-1, 230-2, the carrier vehicle 250, the aerial vehicle 270-1 and the ground vehicle 270-2 may use any client-server applications or features to connect to the network 290 or to communicate with one another, such as through short or multimedia messaging service (SMS or MMS) text messages, social network messages, electronic marketplace messages, telephone calls or the like. For example, in some implementations, the marketplace 210, the customer 220, the fulfillment centers 230-1, 230-2, the carrier vehicle 250, the aerial vehicle 270-1 and the ground vehicle 270-2 may be adapted to transmit information or data in the form of synchronous or asynchronous messages to one another or any other computer device in real time or in near-real time, or in one or more offline processes, via the network 290. Those of ordinary skill in the pertinent art would recognize that the marketplace 210, the customer 220, the fulfillment centers 230-1, 230-2, the carrier vehicle 250, the aerial vehicle 270-1 and the ground vehicle 270-2 may operate any of a number of computing devices that are capable of communicating over the network 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMS, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
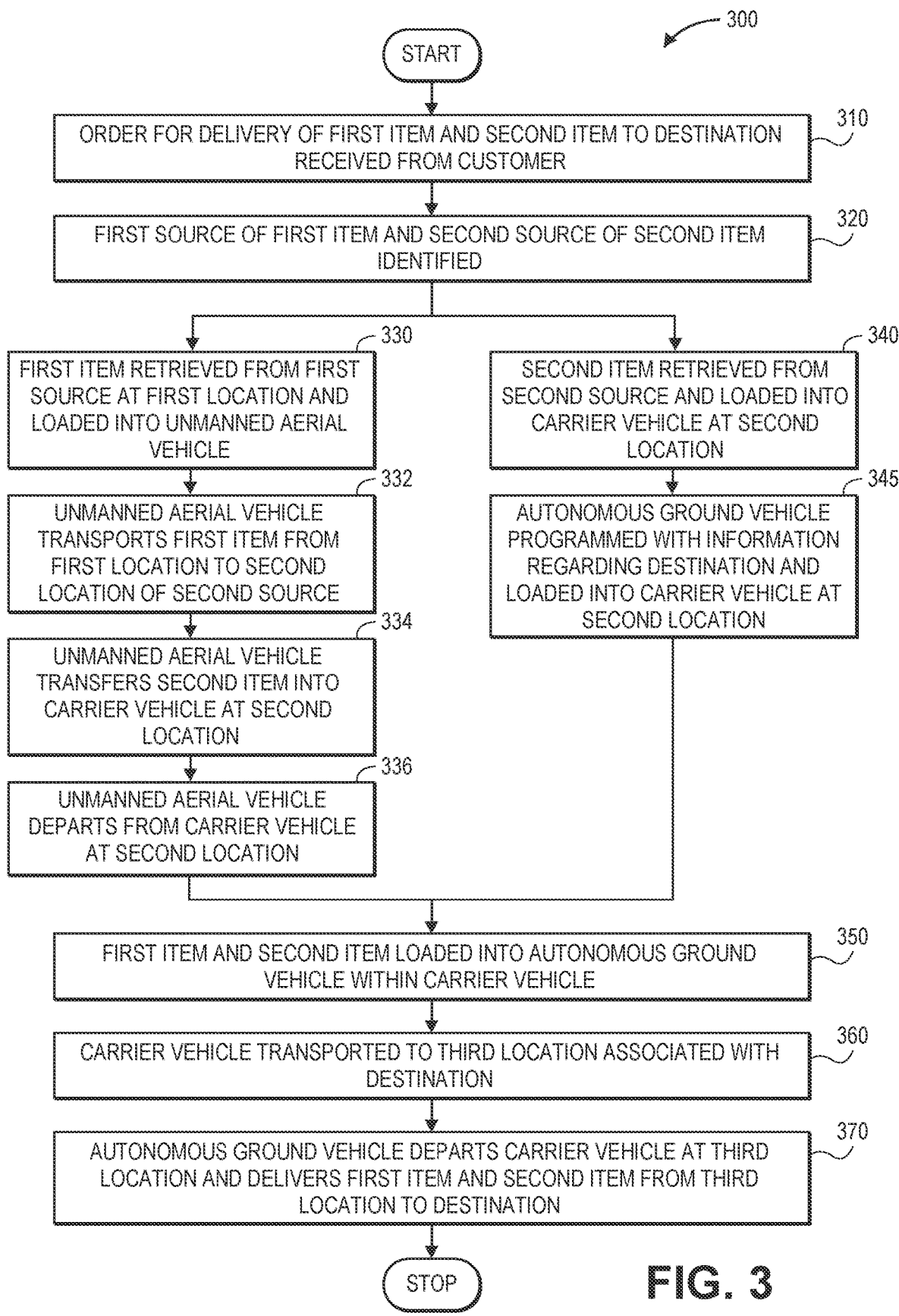
FIG. 3 is a flow chart of one process for delivering items in accordance with implementations of the present disclosure.

Referring to FIG. 3, a flow chart of one process for delivering items in accordance with implementations of the present disclosure is shown. At box 310, an order for a delivery of a first item and a second item to a destination is received from a customer. For example, the customer may place the order electronically, e.g., via a network site or page, a dedicated application, or in any other manner. Alternatively, the customer may place the order in person at a bricks-and-mortar retail establishment, by telephone, or in any other manner. The order may identify not only the first item and the second item but also the destination, e.g., by a street address or another identifier of a dwelling, a building, or another structure or location where the first item and the second item are desired.

In some implementations, the order may include a request for the delivery of one or more other items, in addition to the first item and the second item. In some other implementations, the order may include a request for the delivery of items to two or more destinations.

At box 320, a first source of the first item and a second source of a second item are identified. The first item and the second item may be items of any type or form, including any consumer goods such as convenience goods (e.g., goods that are bought frequently, typically at comparatively low prices, and are easily accessible to customers), specialty goods (e.g., goods having specifically valued attributes or unique brands that are less readily available at select locations or for comparatively high prices), shopping goods (e.g., goods that are bought less frequently than convenience goods but more frequently than specialty goods, such as clothing, furniture, electronic devices, appliances or others), or others. For example, either the first item or the second item may be food products (e.g., raw, cooked, prepared, or processed foods), clothing (e.g., outerwear, shirts, pants, shoes, hats, underwear or others), electronic devices (e.g., smartphones or other devices), tools or hardware, or any other items.

The first source or the second source may be a manufacturer, a merchant, a producer, a seller, a vendor, or any other entity, or a facility associated with such an entity, e.g., a fulfillment center, a materials handling facility, or any other facility where the first item or the second item was assembled, created, grown or manufactured.

The first source and the second source may be identified in any manner and on any basis. For example, in some implementations, one or both of the first source and the second source may be selected based on their proximity to the destination or to one another. In some implementations, the first source or the second source may be selected based on an overall cost, which may be represented financially or in any other manner, such as in terms of money, time, distance, or opportunities, or on any other basis. In some implementations, the first source or the second source may be selected by the customer. In some implementations, the first source or the second source may be selected based on an attribute or a characteristic of the first item or the second item, e.g., a date on which the first item or the second item was assembled, created, grown or manufactured, or any other attributes or characteristics.

For example, in some implementations, the first source or the second source may be identified or selected based on an overall cost to deliver the first item from the first location to the second location, or to deliver the first item and the second item to the third location or to the destination, or on any other basis. Alternatively, or additionally, the first source or the second source may be selected based on overall costs to deliver any other items included in any other orders to other locations or their respective destinations.

At box 330, the first item is retrieved from the first source at the first location and loaded into an unmanned aerial vehicle. For example, the first item may be located in or on a storage unit (e.g., a set of shelves) or any other systems at the first source for accommodating items or containers thereof, e.g., bays, bins, slots, bins, racks, tiers, bars, hooks, or cubbies, or any other like storage means. The storage units or other systems may be arranged in one or more aisles or rows, or any other appropriate regions or stations. The first item may be retrieved or loaded into the unmanned aerial vehicle by a human (e.g., an associate), by a machine (e.g., an autonomous mobile robot), or in any other manner.

The unmanned aerial vehicle may be configured to travel from one location to another location autonomously or in a guided manner by air. The unmanned aerial vehicle may be outfitted or equipped with one or more propulsion motors, propellers, rotors, control surfaces, engagement systems, sensors, power modules, navigation modules or other components. The unmanned aerial vehicle may further include one or more cargo bays, compartments or other spaces or sections for accommodating one or more items therein.

In some implementations, the unmanned aerial vehicle onto which the first item is loaded may be selected on any basis, including an available power level, a speed rating, a noise rating, or any other factor, e.g., a minimum net cost, distance and/or time required to fulfill the order, as well as an operating range, a power rating or a carrying capacity of the unmanned aerial vehicle. Alternatively, the unmanned aerial vehicle may be selected at random, or may be a next available unmanned aerial vehicle for transporting at least the first item.

The first item may be loaded into the unmanned aerial vehicle within a facility of the first source at the first location, or outside of the facility, e.g., on a loading dock, a landing pad, a runway, or any other station.

At box 332, the unmanned aerial vehicle transports the first item from the first location to a second location of the second source. For example, the unmanned aerial vehicle may be programmed with coordinates, geolocators or other identifiers of the second location, or a set of instructions for causing the unmanned aerial vehicle to travel on one or more selected courses, at one or more selected speeds, or at one or more selected altitudes between the first location and the second location.

The unmanned aerial vehicle may transport the first item alone, or the first item along with any number of other items that may be accommodated within a compartment of the unmanned aerial vehicle. Such other items may be selected on any basis. For example, the other items may be accompaniments to the first item for transporting purposes, e.g., ice or heat sources for maintaining the first item at a desired temperature. Alternatively, the other items may be items that are required at the second location and may be selected on any other basis, such as dimensions or masses of such items, anticipated levels of demand for the other items at the first source or the second source, or on any other basis.

At box 334, the unmanned aerial vehicle transfers the first item into a carrier vehicle at the second location. The carrier vehicle may include an interior compartment and an engine, a motor or another prime mover, e.g., a van, that may be manually or autonomously driven to transport contents of the interior compartment to one or more locations. Alternatively, the carrier vehicle may be a trailer or another like system having an interior compartment but no engines or motors, and thereby requiring a connection to or association with one or more powered vehicles, e.g., a road tractor or truck, in order to transport contents of the interior compartment from one location to another location.

In some implementations, the carrier vehicle may include one or more robotic arms or other systems (e.g., conveyors) for automatically retrieving or receiving the first item from the unmanned aerial vehicle. Alternatively, or additionally, the carrier vehicle may include any number of other systems that are designed or configured to manually or automatically retrieve or receive items from unmanned aerial vehicles.

In some implementations, the unmanned aerial vehicle may travel into the carrier vehicle, e.g., land or hover within the carrier vehicle, and the first item may be transferred into the carrier vehicle with the unmanned aerial vehicle therein. Alternatively, or additionally, the unmanned aerial vehicle may land on or hover over or near the carrier vehicle, and the first item may be transferred into the carrier vehicle with the unmanned aerial vehicle external to the carrier vehicle.

Landing or hovering conditions for the unmanned aerial vehicle may be established at the second location, as necessary, prior to causing or enabling the transfer of at least the first item into the carrier vehicle. For example, where the second location is adjacent to or a portion of the second source, the unmanned aerial vehicle may land on or in, or hover over or near, the carrier vehicle at the second location. Alternatively, the carrier vehicle may be in motion when the first item is transferred from the unmanned aerial vehicle into the carrier vehicle. In such implementations, landing or hovering conditions may be established by varying a course and/or a speed of the carrier vehicle (e.g., by a powered vehicle), as necessary, in order to generate optimal wind conditions for landing on or in, or hovering over or near, the carrier vehicle. In some other implementations, the carrier vehicle may be outfitted with any number of ducts, vents, intakes or outlets to enable air flow to enter the carrier vehicle, to travel therethrough at desired velocities and/or pressures, and/or to exit from the intermodal carrier vehicle, as well as any number of heaters, chillers, humidifiers and/or dehumidifiers to establish or maintain temperatures and/or humidity levels within the carrier vehicle prior to landing on or in, or hovering over or near, the carrier vehicle.

At box 336, the unmanned aerial vehicle departs from the carrier vehicle at the second location. For example, the unmanned aerial vehicle may take off from the second location, or any other location at which the first item was transferred into the unmanned aerial vehicle and travel to another location, e.g., to return to the first location, or to travel to any other location. In some implementations, conditions for launching the unmanned aerial vehicle may be established at the second location or anywhere else, as necessary, after at least the first item was transferred into the carrier vehicle. For example, where the carrier vehicle in motion when the unmanned aerial vehicle is to depart from the carrier vehicle, launching conditions may be established by varying a course and/or a speed of the carrier vehicle (e.g., by a powered vehicle), as necessary, in order to generate optimal wind conditions for departing from the carrier vehicle.

In some implementations, after transferring the first item into the carrier vehicle or prior to departing from the carrier vehicle, one or more items may be loaded into the unmanned aerial vehicle, and the unmanned aerial vehicle may transport such other items to any other location. For example, where the first item was loaded into the unmanned aerial vehicle in a container, the same container (or a similar container) may be returned to the unmanned aerial vehicle after the first item has been transferred therein. In some other implementations, a third item may be loaded into the unmanned aerial vehicle at the second location, and the unmanned aerial vehicle may then depart from the carrier vehicle to transport the third item to an intended destination for the third item.

In parallel, at box 340, the second item is retrieved from the second source and loaded into the carrier vehicle at the second location. For example, as with the first item, the second item may be located in or on a storage unit (e.g., a set of shelves) or any other systems at the second source for accommodating items or containers thereof, e.g., bays, slots, bins, racks, tiers, bars, hooks, or cubbies, or any other like storage means. The storage units or other systems may be arranged in one or more aisles or rows, or any other appropriate regions or stations. The second item may be retrieved or loaded into the carrier vehicle by a human (e.g., an associate), by a machine (e.g., an autonomous mobile robot), or in any other manner.

At box 345, an autonomous ground vehicle is programmed with information regarding the destination and loaded into the carrier vehicle at the second location. For example, the autonomous ground vehicle may be programmed with one or more navigation maps or environment maps of a region or an area in which the destination is located, or any other regions or areas. The autonomous ground vehicle may be programmed with coordinates, geolocators or other identifiers of the second location, or a set of instructions for causing the unmanned aerial vehicle to travel on one or more selected courses, or at one or more selected speeds between the first location and the second location.

At box 350, the first item and the second item are loaded into the autonomous ground vehicle within the carrier vehicle. In some implementations, the first item and the second item may be loaded into the autonomous ground vehicle within the carrier vehicle by one or more humans, who may retrieve the item from the unmanned aerial vehicle at box 334 or one or more locations of the second source at box 340, and manually load the items into a cargo bay or another compartment of the autonomous ground vehicle. Alternatively, or additionally, the first item or the second item may be loaded into such a cargo bay or compartment by one or more machines, robots or automatic systems, such as a robotic arm, a conveyor, or any other system. Moreover, in some implementations, the autonomous ground vehicle may include one or more sensors or other systems (e.g., cameras, weight sensors, or others) that may open one or more doors or other systems to enable items to be loaded therein, and determine or detect when one or more items have been loaded into a cargo bay or other compartment, before closing the doors or otherwise operating the systems to cause the one or more items to be secured therein.

At box 360, the carrier vehicle is transported to a third location associated with the destination. For example, in some implementations, the carrier vehicle may be manually or autonomously driven to the third location with the first item, the second item and the autonomous ground vehicle therein along one or more roads, streets, highways or other ways. Alternatively, the carrier vehicle may be coupled to another powered vehicle, e.g., a road tractor, and towed or otherwise transported to the third location.

The third location may be selected on any basis. For example, the third location may be associated with a road, a street, an avenue, a parking lot, a bus stop, or any other location that may be readily accessed by the carrier vehicle and is capable of accommodating a release of the autonomous ground vehicle therefrom. In some implementations, where the destination is not accessible to the carrier vehicle, such as where the destination is indoors, or is not directly accessible by automobiles or other substantially large vehicles, but is accessible to the autonomous ground vehicle, the third location may be selected as a location that is proximate to or within a short range of the destination, and includes sufficient infrastructure or other systems to enable the autonomous ground vehicle to deliver the item from the third location to the destination.

In some other implementations, the third location may be selected based on destinations of any other orders including items that are to be delivered by the autonomous ground vehicle or the carrier vehicle, on any basis. For example, where multiple orders for deliveries of items are received from customers in a single neighborhood, complex or area, and such orders are to be fulfilled using the autonomous ground vehicle or the carrier vehicle, the third location may be selected in accordance with a plan or a path to fulfill all of such orders, not just the order for the delivery of the first item and the second item to the destination received at box 310. Such a plan or path may be determined in any manner that minimizes an overall cost for fulfilling some or all of such orders, according to a priority level of the order or any other orders, or on any other basis.

The first item and the second item may be transferred into the interior compartment of the carrier vehicle and loaded into the autonomous ground vehicle in any order or sequence. For example, in some implementations, the first item and the second item may be transferred into the interior compartment of the carrier vehicle, and loaded into the cargo bay or other compartment of the autonomous ground vehicle, while the carrier vehicle is stationary at the second location. Alternatively, the unmanned aerial vehicle may transfer at least the first item into the interior compartment of the carrier vehicle, and the first item and the second item may be loaded into the autonomous ground vehicle, while the carrier vehicle is en route to the third location. Moreover, in some implementations, the first item and the second item may be loaded into one or more discrete compartments of the autonomous ground vehicle associated with the order. For example, in some implementations, the autonomous ground vehicle may include independently accessible compartments that may be associated with multiple individual orders.

At box 370, the autonomous ground vehicle departs from the carrier vehicle at the third location and delivers the first item and the second item to the destination, and the process ends. In some implementations, the carrier vehicle may include one or more doors and ramps or other transition surfaces or systems enabling the carrier vehicle to depart from the carrier vehicle under its own power, e.g., upon executing one or more sets of instructions. Alternatively, the autonomous ground vehicle may be released or otherwise transferred out of the carrier vehicle in any other manner. For example, in some implementations, the carrier vehicle may be stopped when the autonomous ground vehicle is released or departs therefrom, e.g., either "in neutral," such as where power is not being applied to the wheels of the autonomous ground vehicle, or under power. Alternatively, the carrier vehicle may be in motion when the autonomous ground vehicle is released or departs therefrom, such as where the autonomous ground vehicle may be released or depart from the carrier vehicle at a predetermined velocity.

In some implementations, the autonomous ground vehicle may proceed directly from the third location to the destination. Alternatively, the autonomous ground vehicle may proceed to other destinations for other orders prior to proceeding to the destination and delivering the first item and the second time to the destination, or after delivering the first item and the second item to the destination.

Once the autonomous ground vehicle has been released from the carrier vehicle, the autonomous ground vehicle may travel on one or more courses or at one or more speeds to a location associated with the destination, e.g., a front door, a side door, a backyard, a lawn, a driveway, or a garage of a home, as well as a foyer or an entrance way of an apartment building or office, or any other location specified in the order or otherwise associated with the destination. In some implementations, the autonomous ground vehicle may be outfitted or equipped with one or more robotic arms or other features for causing the first item and the second item to be released from a cargo bay or another compartment of the autonomous ground vehicle at a location associated with the destination. Alternatively, or additionally, the autonomous ground vehicle may be configured with one or more doors having locking or securing systems that may be automatically unlocked or opened to enable the customer or another person associated with the order or the destination to reach into and remove at least the first item and the second item therefrom.

In some implementations, the autonomous ground vehicle may be programmed with information regarding the destination at any time after the order is received at box 310, and prior to the delivery of the first item and the second item to the destination at box 370. Moreover, in some implementations, the autonomous ground vehicle may be programmed with updated information regarding the destination at any time prior to the delivery of the first item and the second item to the destination at box 370. For example, as weather, traffic or other conditions within a vicinity of the third location or the destination change, updated information regarding changes in such conditions may be transmitted to the autonomous ground vehicle directly or by way of the carrier vehicle or any other systems.

Figure 4:
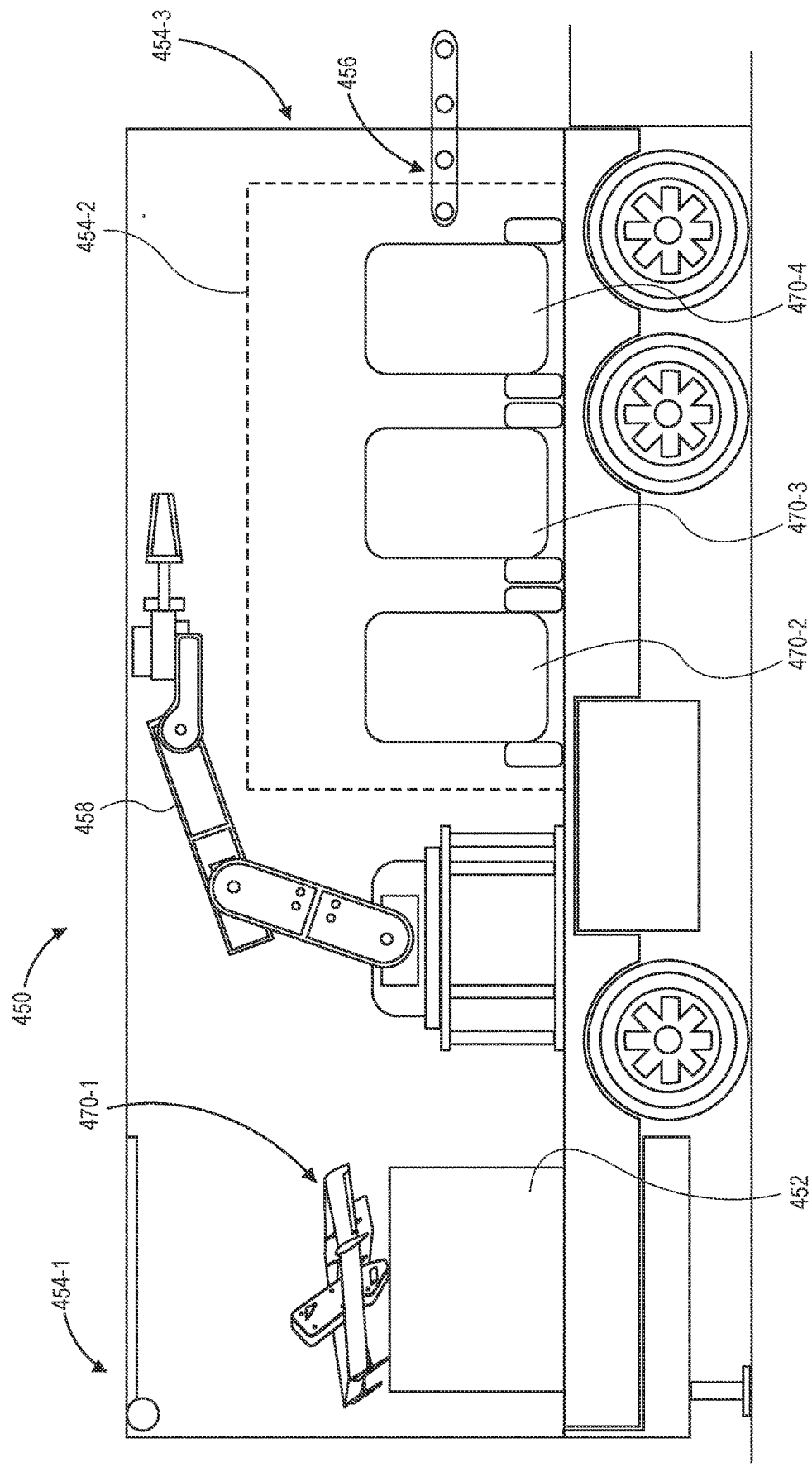
FIG. 4 is a view of aspects of one delivery system in accordance with implementations of the present disclosure.

Items may be transferred into carrier vehicles by one or more aerial vehicles, and loaded into one or more ground vehicles within the carrier vehicles, in any manner. Referring to FIG. 4, a view of aspects of one delivery system in accordance with implementations of the present disclosure is shown. Except where otherwise noted, reference numerals preceded by the number "4" in FIG. 4 refer to elements that are similar to elements having reference numerals preceded by the number "2" in FIGS. 2A through 2F or by the number "1" shown in FIGS. 1A through 1L.

As is shown in FIG. 4, a carrier vehicle 450 includes an elevator system 452, a conveyor 456, an engagement system 458 within an interior compartment, along with an aerial vehicle 470-1 and a plurality of ground vehicles 470-2, 470-3, 470-4 (e.g., autonomous ground vehicles, or robots). The carrier vehicle 450 further includes a plurality of doors 454-1, 454-2, 454-3 or other access control systems that may be operated to access the interior compartment or secure access thereto.

In accordance with implementations of the present disclosure, the aerial vehicle 470-1 may enter or land within the interior compartment of the carrier vehicle 450 by the elevator system 452. When the door 454-1 is open, the elevator system 452 may rise to or above a level of an upper surface of the carrier vehicle 450, and an aerial vehicle, viz., the aerial vehicle 470-1, may land on or otherwise engage with the elevator system 452, which may then cause the aerial vehicle 470-1 to descend below the level of the upper surface of the carrier vehicle 450 and into the interior compartment.

The conveyor 456 extends into the interior compartment from a system external to the carrier vehicle 450, e.g., a source of items, such as a fulfillment center.

The engagement system 458 is a robotic arm (e.g., a six-degrees-of-freedom robotic arm) or another system for grasping or manipulating items within the carrier vehicle 450.

The ground vehicles 470-2, 470-3, 470-4 may be autonomous ground vehicles, or robots, having any number of power supplies, axles, shafts and/or wheels for causing the ground vehicles 470-2, 470-3, 470-4 to travel in desired directions or at desired speeds. The ground vehicles 470-2, 470-3, 470-4 may further include cargo bays or other storage compartments for accommodating items therein, as well as any number of sensors (e.g., imaging devices or other directional sensors).

Thus, in accordance with some implementations of the present disclosure, when the aerial vehicle 470-1 enters or lands within the interior compartment of the carrier vehicle 450, the engagement system 458 may retrieve any items from the aerial vehicle 470-1, and cause one or more of such items to be loaded onto one or more of the ground vehicles 470-2, 470-3, 470-4. Additionally, when one or more items are placed onto the conveyor 456 and transferred into the interior compartment, the engagement system 458 may grasp or otherwise manipulate such items, and cause one or more of such items to be loaded onto one or more of the ground vehicles 470-2, 470-3, 470-4. In some implementations, the ground vehicles 470-2, 470-3, 470-4 into which the items are loaded may be selected on any basis, such as available power levels, operating ranges, power ratings or carrying capacities of the ground vehicles 470-2, 470-3, 470-4, or on any other factor.

Subsequently, the carrier vehicle 450 may then be transported to locations associated with destinations for such items, e.g., by a powered vehicle. One or more of the ground vehicles 470-2, 470-3, 470-4 may then be released from the carrier vehicle 450, e.g., by way of the door 454-3, separately or together, and programmed or configured to deliver the items therein to their respective destinations.

Figure 5A:
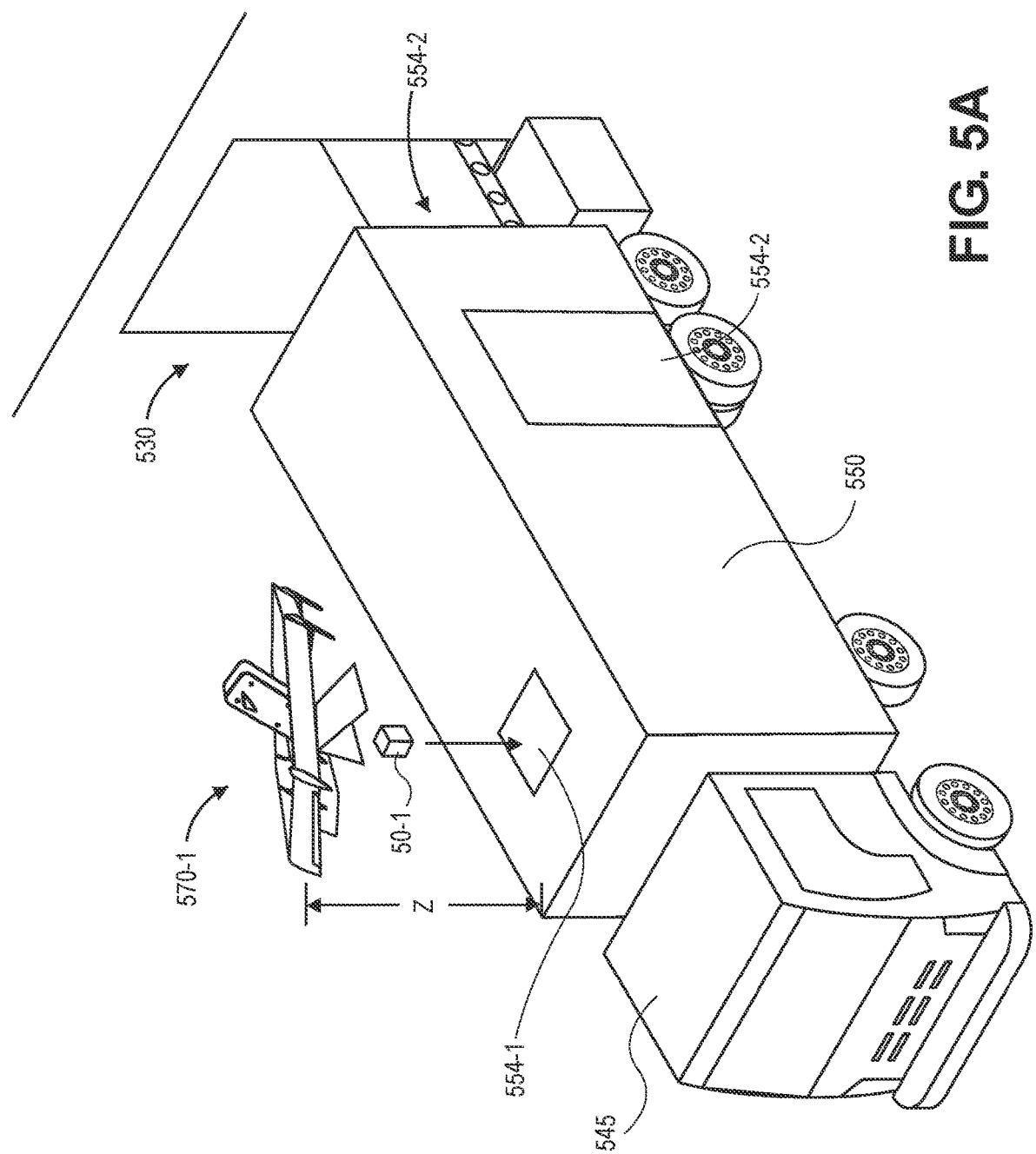
FIGS. 5A through 5C are views of aspects of one delivery system in accordance with implementations of the present disclosure.
Figure 5B:
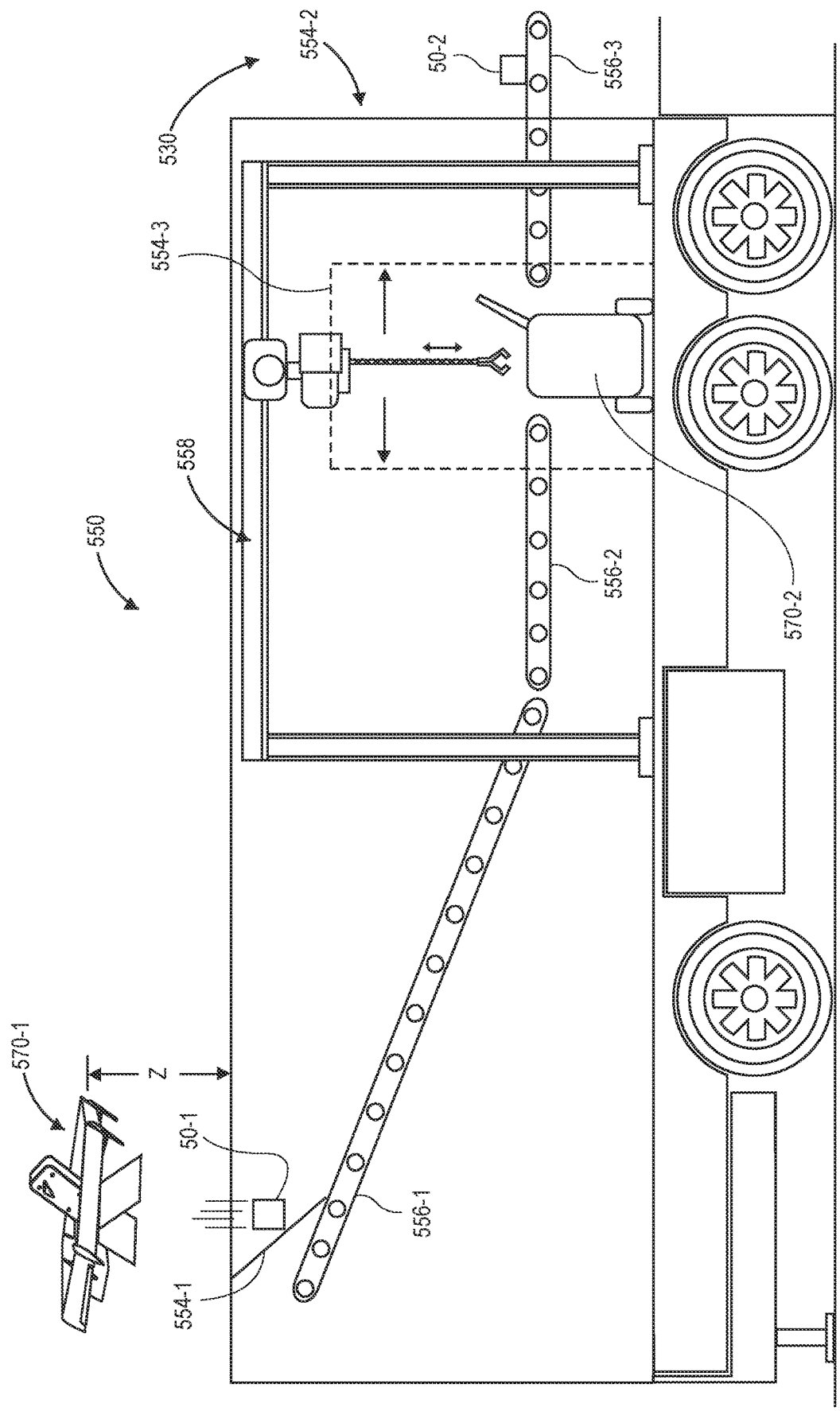
Figure 5C:
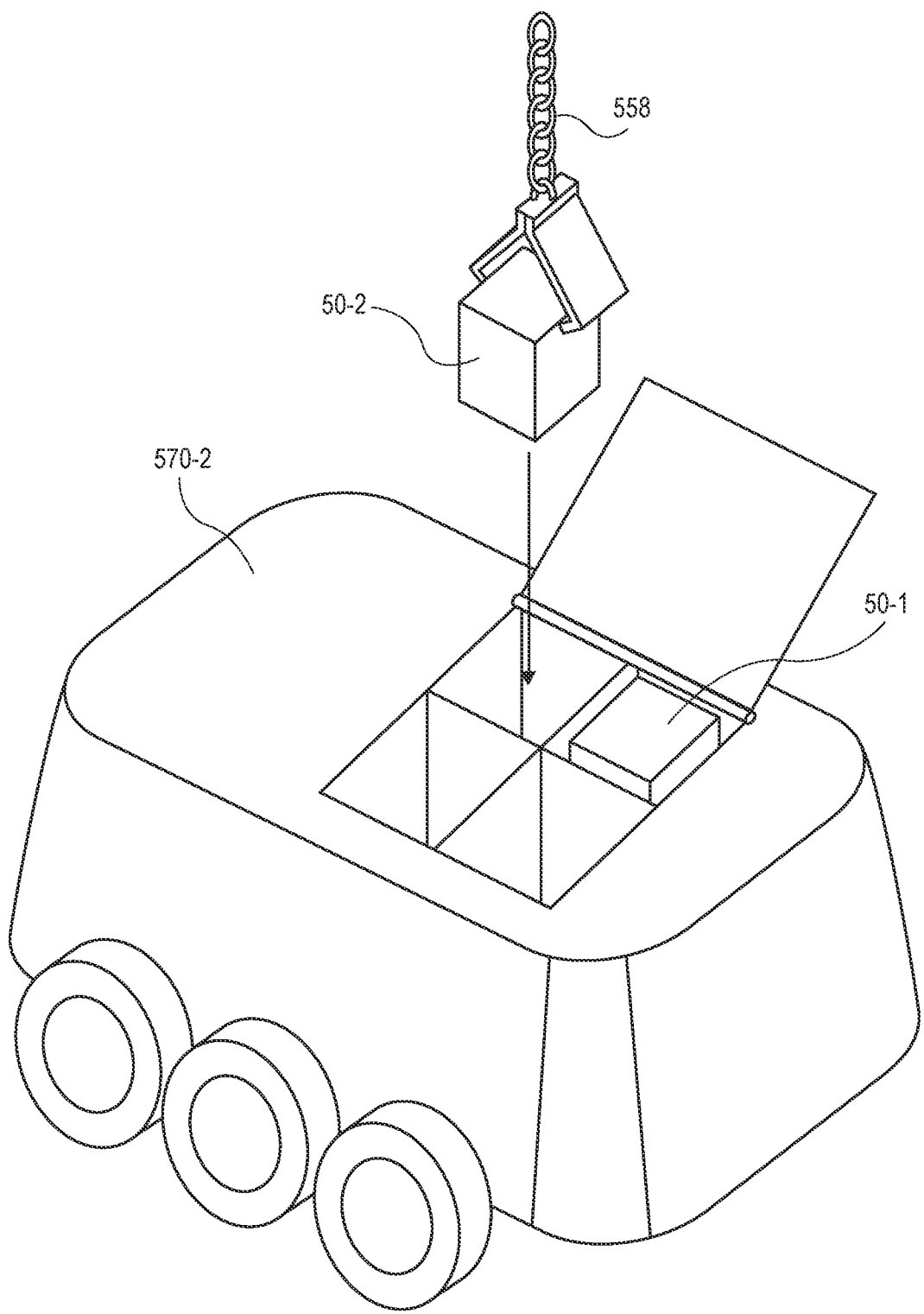

Referring to FIGS. 5A through 5C, a view of aspects of one delivery system in accordance with implementations of the present disclosure is shown. Except where otherwise noted, reference numerals preceded by the number "5" in FIGS. 5A through 5C refer to elements that are similar to elements having reference numerals preceded by the number "4" in FIG. 4, by the number "2" in FIGS. 2A through 2F or by the number "1" shown in FIGS. 1A through 1L.

As is shown in FIG. 5A, an aerial vehicle 570-1 hovers at an altitude z over a carrier vehicle 550 provided outside a source 530 of items, e.g., a fulfilment center or a facility associated with a manufacturer, a merchant, a producer, a seller, a vendor, or any other entity. The carrier vehicle 550 is coupled to a powered vehicle 545 outside of the source 530.

The aerial vehicle 570-1 releases an item 50-1 over a door 554-1, which may be provided in an upper surface of the carrier vehicle 550. The door 554-1 may be spring-loaded or biased in a closed position, until a bias supplied to the door 554-1 is overcome, e.g., by a weight of the item 50-1.

As is shown in FIG. 5B, an interior compartment of the carrier vehicle 550 includes a plurality of conveyors 556-1, 556-2, 556-3, a gantry crane (or an overhead crane) 558 and a ground vehicle 570-2 (e.g., an autonomous ground vehicle) provided therein. The conveyor 556-1 includes a belt or another moving surface defining a plane that is aligned at an angle with respect to the upper surface of the carrier vehicle 550, and descends from a location beneath the door 554-1 to a height of the conveyor 556-2, which includes a belt or another moving surface defining a plane that is aligned substantially horizontally. Additionally, the conveyor 556-3 extends between the source 530 and the interior compartment of the carrier vehicle 550, and also includes a belt or another moving surface defining a plane that is aligned substantially horizontally. The gantry crane 558 is provided over portions of the conveyors 556-2, 556-3, and may include a hoist on a trolley or other movable system slidably mounted to a girder aligned parallel to a transverse axis of the carrier vehicle 550, with the girder having carriages or other systems enabling the girder to travel along one or more beams aligned in parallel to a longitudinal axis of the carrier vehicle 550. The gantry crane 558 may operate the trolley and raise or lower the hoist to engage with items on either of the conveyors 556-2, 556-3 and load such items into the ground vehicle 570-2.

Thus, in accordance with implementations of the present disclosure, when the item 50-1 descends into the interior compartment of the carrier vehicle 550 by way of the door 554-1, the item 50-1 lands on the conveyor 556-1 and travels down to the conveyor 556-2, where the gantry crane 558 may engage with the item 50-1 and load the item 50-1 into the ground vehicle 570-2. Likewise, when an item 50-2 is placed on the conveyor 556-3, e.g., within or near the source 530, the item 50-2 may be transferred into the interior compartment of the carrier vehicle 550, where the gantry crane 558 may engage with the item 50-2 and load the item 50-2 into the ground vehicle 570-2.

For example, as is shown in FIG. 5C, after the gantry crane 558 has placed the item 50-1 within one compartment of the ground vehicle 570-2, the gantry crane 558 may retrieve the item 50-2 from the conveyor 556-3 and place the item 50-2 into another compartment of the ground vehicle 570-2.

Subsequently, the carrier vehicle 550 may be transported to a location associated with a destination for either or both of the items 50-1, 50-2, e.g., by the powered vehicle 545. The ground vehicle 570-2 may then be released from the carrier vehicle 550, e.g., by way of the door 554-3, and programmed or configured to deliver either or both of the items 50-1, 50-2 therein to their respective destinations.

Figure 6:
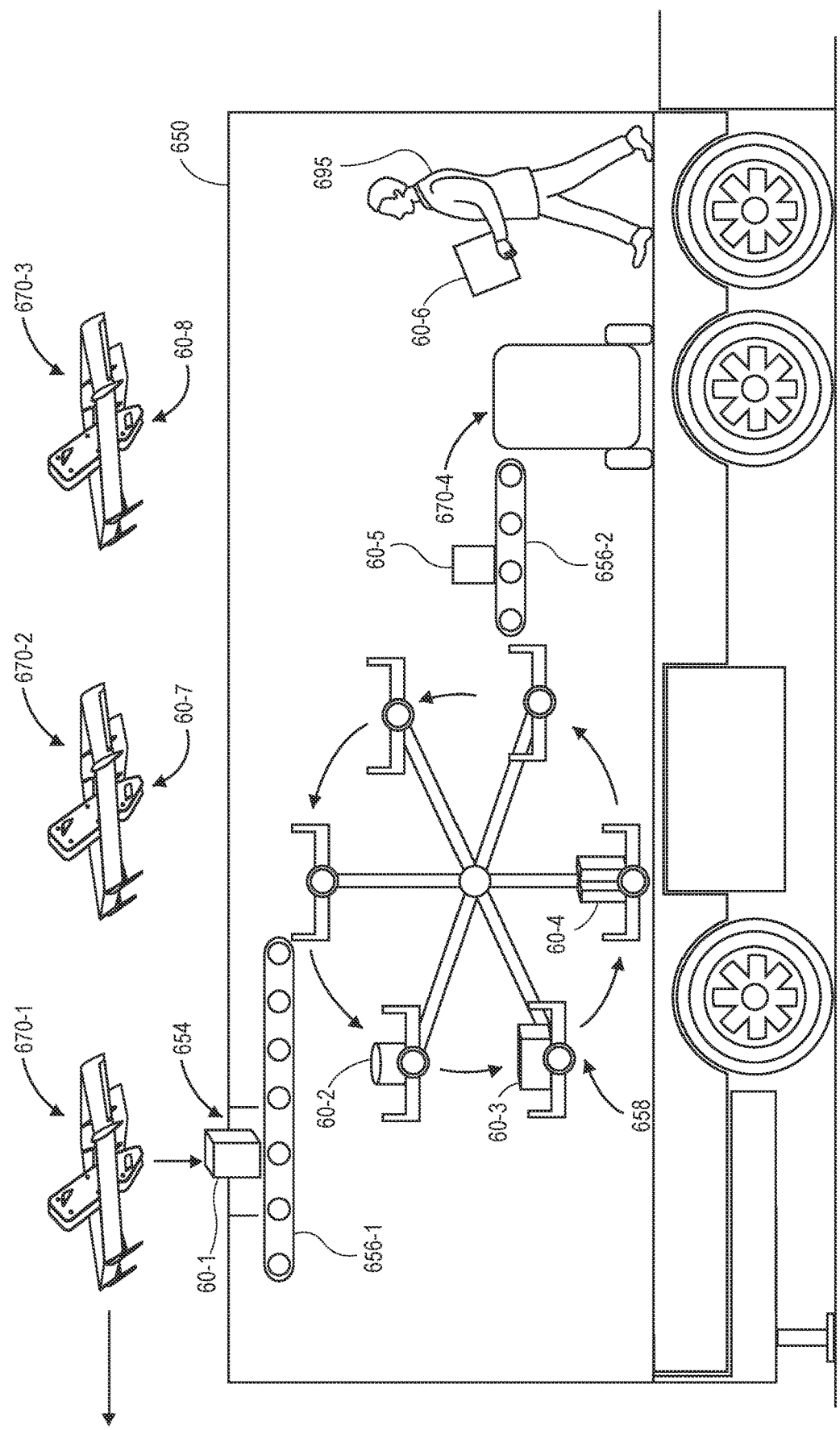
FIG. 6 is a view of aspects of one delivery system in accordance with implementations of the present disclosure.

Referring to FIG. 6, a view of aspects of one delivery system in accordance with implementations of the present disclosure is shown. Except where otherwise noted, reference numerals preceded by the number "6" in FIG. 6 refer to elements that are similar to elements having reference numerals preceded by the number "5" in FIGS. 5A through 5C, by the number "4" in FIG. 4, by the number "2" in FIGS. 2A through 2F or by the number "1" shown in FIGS. 1A through 1L.

As is shown in FIG. 6, a carrier vehicle 650 includes a chute 654 or another opening provided in an upper surface of the carrier vehicle 650, a pair of conveyors 656-1, 656-2, and a rotatable engagement system 658. The chute 654 extends between an exterior of the carrier vehicle 650 and an interior compartment of the carrier vehicle 650, and may include one or more doors or other access control systems that enable the chute 654 to remain open or partially or entirely closed.

The rotatable engagement system 658 includes a plurality of baskets or bins (viz., six) arranged in a Ferris wheel-type configuration, each of which may be mounted to a hub by one or more spoke-type systems. The rotatable engagement system 658 may be manually or automatically operated to rotate about a horizontal axis defined by the hub or between six discrete angular orientations. The baskets or bins of the rotatable engagement system 658 may be configured to remain horizontal, or substantially horizontal, in each of the angular orientations.

The conveyor 656-1 extends between a vicinity of the chute 654 and a position of one of the baskets or bins when the rotatable engagement system 658 is in one of the discrete angular orientations. Additionally, the conveyor 656-2 extends between a vicinity of a ground vehicle 670-4 within the interior compartment of the carrier vehicle 650.

With the rotatable engagement system 658 in each of the discrete angular orientations, one of the baskets or bins may be aligned or disposed beneath the chute 654. As is shown in FIG. 6, an aerial vehicle 670-1 may hover over the chute 654 and release an item 60-1 into the chute 654, which transfers the item 60-1 into the interior compartment of the carrier vehicle 650, and into one of the baskets or bins of the rotatable engagement system 658, which may further include any number of other items 60-2, 60-3, 60-4. Other aerial vehicles 670-2, 670-3 may likewise hover over the carrier vehicle 650 and release any number of other items into the chute 654.

Additionally, as is also shown in FIG. 6, an item 60-5 may be transferred from one of the baskets or bins to the conveyor 656-2, and loaded into a ground vehicle 670-4 (viz., an autonomous ground vehicle) within the interior compartment of the carrier vehicle 650. An associate 695 may also receive or retrieve an item 60-6 from a source (e.g., a fulfillment center or a facility associated with a manufacturer, a merchant, a producer, a seller, a vendor, or any other entity) and load the item 60-6 into the ground vehicle 670-4 within the interior compartment of the carrier vehicle 650.

After the item 60-5 has been removed therefrom, the rotatable engagement system 658 may be rotated to another of the discrete angular orientations in which a basket or bin that is empty or has sufficient capacity to receive one or more items is aligned beneath the chute 654. The rotatable engagement system 658 may then receive additional items 60-7, 60-8 from the aerial vehicles 670-2, 670-3, which may hover over the chute 654 and release the items 60-6, 60-7 into the chute 654, thereby transferring each of the items 60-6, 60-7 into one or more of the baskets or bins of the rotatable engagement system 658.

Subsequently, the carrier vehicle 650 may be transported to a location associated with a destination for either or both of the items 60-5, 60-6, e.g., by a powered vehicle, or locations associated with destinations for any of the items 60-1, 60-2, 60-3, 60-4, 60-7, 60-8 and the ground vehicle 670-4 may then be released from the carrier vehicle 650 in any manner and programmed or configured to deliver any of the items therein to their respective destinations.

Although some of the delivery systems disclosed herein are depicted in use in connection with trailers or other road vehicles, those of ordinary skill in the pertinent arts will recognize that the systems and methods of the present disclosure are not so limited. Rather, the delivery systems of the present disclosure may utilize any type of vehicle that is configured to transport items from one location (e.g., a fulfillment center or any other source of items) to another location. The delivery systems of the present disclosure may further include any type of vehicles that are configured to transfer items or materials to a human, a machine or another vehicle, or to receive items or materials from a human, a machine or another vehicle, as necessary. In this regard, the delivery systems of the present disclosure may include vehicles that are configured to travel by air, by sea, or across outer space, as well as on land, with one or more items and vehicles disposed therein.

Furthermore, although some of the implementations of the present disclosure depict the delivery of items that are made available to customers through electronic marketplaces, those of ordinary skill in the pertinent arts will recognize that the systems and methods of the present disclosure are not so limited. Rather, delivery systems may be used to deliver items that may be made available through traditional commercial channels, e.g., by telephone or in one or more bricks-and-mortar stores, and delivered to customers or designated locations rapidly in response to orders for such items. Moreover, although some of the implementations of the present disclosure depict delivery systems or vehicles thereof that are small in size, those of ordinary skill in the pertinent arts will recognize that the systems and methods of the present disclosure are not so limited. Rather, vehicles of the present disclosure may be of any size or shape, and may be configured or outfitted with features that enable the distribution, delivery, retrieval or manufacture of items of any type or kind, and of any size or shape, in accordance with the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIG. 3, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system comprising:
   a first source of items;
   a second source of items;
   an unmanned aerial vehicle;
   a carrier vehicle;
   a powered vehicle, wherein the powered vehicle is coupled to the carrier vehicle;
   an autonomous ground vehicle; and
   a computer system in communication with at least the first source of items, the second source of items, the unmanned aerial vehicle, the powered vehicle, the carrier vehicle and the autonomous ground vehicle,
   wherein the computer system is configured to at least:
      receive an order for a delivery of at least a first item and a second item to a destination;
      determine that the first item is in inventory at the first source;
      determine that the carrier vehicle is located at the second source;
      transmit instructions for causing at least the first item to be retrieved from the first source and loaded into the unmanned aerial vehicle;
      transmit instructions for causing the unmanned aerial vehicle to transport at least the first item to the carrier vehicle at the second source of items;
      transmit instructions for causing at least the second item to be retrieved from the second source and transferred into the carrier vehicle;
      transmit instructions for loading at least the first item and the second item into the autonomous ground vehicle within the carrier vehicle at the second location;
      transmit instructions for causing the powered vehicle to transport the carrier vehicle to a third location associated with the destination; and
      transmit instructions for causing the autonomous ground vehicle to deliver at least the first item and the second item from the third location to the destination.

2. The system of claim 1, wherein the carrier vehicle comprises a door provided in an upper surface of the carrier vehicle, and wherein the instructions for causing the unmanned aerial vehicle to transport at least the first item to the carrier vehicle at the second source of items comprise:
instructions for causing the unmanned aerial vehicle to hover over the door at a predetermined altitude; and
instructions for causing the unmanned aerial vehicle to release at least the first item over the door,
wherein the first item is transferred into the interior compartment by way of the door.

3. A method comprising:
identifying information regarding a first order for a delivery of at least a first item and a second item to a first destination;
selecting a first source of the first item;
causing at least the first item to be transported from a first location of the first source to a second location of a second source of the second item by an unmanned aerial vehicle;
transferring at least the first item from the unmanned aerial vehicle into an interior compartment of a carrier vehicle at the second location;
transferring at least the second item into the interior compartment at the second location;
causing at least the first item and the second item to be loaded into a first autonomous ground vehicle within the interior compartment;
transporting the carrier vehicle to a third location associated with the first destination; and
with the carrier vehicle at the third location,
causing the first autonomous ground vehicle to depart from the carrier vehicle; and
causing the first autonomous ground vehicle to deliver at least the first item and the second item to the first destination.

4. The method of claim 3, wherein the first source is one of:
a fulfillment center having at least the first item in inventory;
a manufacturer of the first item;
a merchant of the first item;
a seller of the first item; or
a vendor of the first item.

5. The method of claim 3, wherein selecting the first source comprises:
identifying a plurality of sources having access to at least the first item, wherein the first source is one of the plurality of sources;
determining at least one of a cost or a minimum time for delivering at least the first item from each of the plurality of sources to the second location of the second source; and
selecting one of the plurality of sources having at least one of a lowest cost or a lowest minimum time for delivering at least the first item from each of the plurality of sources to the second location of the second source,
wherein the first source is the selected one of the plurality of sources.

6. The method of claim 3, further comprising:
prior to causing at least the first item and the second item to be loaded into the first autonomous ground vehicle within the interior compartment,
operating at least one access control system provided in an upper surface of the carrier vehicle to provide access to the interior compartment of the carrier vehicle; and
causing the unmanned aerial vehicle to enter the interior compartment by way of the at least one access control system, wherein at least the first item is transferred from the unmanned aerial vehicle into the interior compartment with the unmanned aerial vehicle within the interior compartment.

7. The method of claim 3, further comprising:
prior to causing at least the first item and the second item to be loaded into the first autonomous ground vehicle within the interior compartment,
causing the unmanned aerial vehicle to hover over at least one access control system provided in an upper surface of the carrier vehicle at a predetermined altitude; and
causing the unmanned aerial vehicle to release at least the first item over the at least one access control system,
wherein the first item is transferred into the interior compartment by way of the at least one access control system.

8. The method of claim 3, wherein the carrier vehicle further comprises an engagement system within the interior compartment,
wherein transferring at least the first item from the unmanned aerial vehicle to the interior compartment comprises:
receiving at least the first item from the unmanned aerial vehicle by the engagement system, and
wherein at least one of the first item or the second item is caused to be loaded into the first autonomous ground vehicle within the interior compartment by the engagement system.

9. The method of claim 8, wherein the engagement system comprises a rotatable system having a plurality of bins,
wherein the rotatable system is configured to be aligned in a plurality of orientations,
wherein the first item is received in a first bin of the plurality of bins when the rotatable system is in a first orientation, and
wherein the first bin is aligned with an access control system providing access to the interior compartment with the rotatable system in the first orientation.

10. The method of claim 8, wherein the carrier vehicle further comprises a robotic arm within the interior compartment,
wherein at least the first item is received from the unmanned aerial vehicle by the robotic arm, and
wherein at least the first item and the second item are caused to be loaded into the first autonomous ground vehicle within the interior compartment by the robotic arm.

11. The method of claim 8, wherein the carrier vehicle further comprises a gantry crane within the interior compartment, and
wherein at least the first item and the second item are caused to be loaded into the first autonomous ground vehicle within the interior compartment by the gantry crane.

12. The method of claim 3, wherein the carrier vehicle comprises a plurality of autonomous ground vehicles within the interior compartment,
wherein the method further comprises:
determining at least one of an available power level, an operating range, a power rating or a carrying capacity of each of the plurality of autonomous ground vehicles; and
selecting one of the plurality of autonomous ground vehicles based at least in part on the available power level, the operating range, the power rating or the carrying capacity of the selected one of the plurality of autonomous ground vehicles, wherein the first autonomous ground vehicle is the selected one of the plurality of autonomous ground vehicles.

13. The method of claim 3, further comprising:
identifying information regarding a second order for a delivery of at least a third item to a second destination;
transferring at least the third item into the interior compartment of the carrier vehicle at the second location;
causing at least the third item to be loaded into the first autonomous ground vehicle within the interior compartment;
selecting the third location based at least in part on the first destination and the second destination; and
causing the first autonomous ground vehicle to deliver at least the third item to the second destination.

14. The method of claim 3, wherein identifying the information regarding the first order for the delivery of at least the first item and the second item to the first destination comprises:
receiving at least some of the information regarding the first order from a computer device associated with the customer by way of at least one application executed by the computer device,
wherein the at least one application comprises at least one of:
a browser accessing a network site of an electronic marketplace; or
a shopping application associated with the electronic marketplace, and
wherein the first destination is one of a home of a customer or a location specified by the customer.

15. The method of claim 3, wherein causing at least the first item to be transported from the first location to the second location by the unmanned aerial vehicle comprises:
causing at least the first item and a third item to be loaded into the unmanned aerial vehicle at the first location,
wherein transferring at least the first item from the unmanned aerial vehicle to the interior compartment at the second location comprises:
transferring the first item and the third item from the unmanned aerial vehicle to the interior compartment at the second location, and
wherein the method further comprises:
causing the third item to be loaded into one of the first autonomous ground vehicle or a second autonomous ground vehicle within the interior compartment.

16. The method of claim 15, further comprising:
determining a level of demand for each of a plurality of items at the first location, wherein the third item is one of the plurality of items, and wherein each of the plurality of items is in inventory at the second source; and
identifying one of the plurality of items based at least in part on the levels of demand,
wherein the third item is the one of the plurality of items.

17. The method of claim 3, further comprising:
causing the first item to be retrieved from a storage area at the first source and deposited within a container; and
loading at least the container into the unmanned aerial vehicle,
wherein transferring at least the first item from the unmanned aerial vehicle into the interior compartment of the carrier vehicle at the second location comprises:
retrieving the container from the unmanned aerial vehicle within the carrier vehicle, and
wherein causing at least the first item and the second item to be loaded into the first autonomous ground vehicle within the interior compartment comprises:
loading the container into the first autonomous ground vehicle within the interior compartment.

18. The method of claim 3, wherein the carrier vehicle is a trailer, and
wherein the carrier vehicle is transported to the third location by a road tractor.

19. A method comprising:
receiving information regarding an order from a customer, wherein the information regarding the order identifies the customer, the first item and a destination for a delivery of at least the first item;
determining that the first item is located in a first facility at a first location;
determining that a carrier vehicle is located at a second location, wherein the carrier vehicle comprises:
an interior compartment;
at least a first access control system for accessing the interior compartment; and
an autonomous ground vehicle within the interior compartment;
loading at least the first item into an unmanned aerial vehicle at the first location;
causing the unmanned aerial vehicle to transport at least the first item from the first location to the second location;
transferring the first item into the interior compartment by way of the first access control system at the second location;
loading at least the first item into a storage compartment of the autonomous ground vehicle within the interior compartment;
causing the carrier vehicle to travel to a third location associated with the destination;
releasing the autonomous ground vehicle from the carrier vehicle at the third location; and
delivering at least the first item from the third location to the destination by the autonomous ground vehicle.

20. The method of claim 19, wherein the information regarding the order further identifies a second item, and
wherein the method further comprises:
determining that the second item is located in a second facility at the second location; and
transferring at least the second item into the interior compartment of the carrier vehicle at the second location,
wherein loading at least the first item into the storage compartment of the autonomous ground vehicle within the interior compartment comprises:
loading the first item and the second item into the storage compartment of the autonomous ground vehicle within the interior compartment, and
wherein delivering at least the first item from the third location to the destination by the autonomous ground vehicle comprises:
delivering the first item and the second item from the third location to the destination by the autonomous ground vehicle.

* * * * *